United States Patent
Tomooka et al.

(10) Patent No.: US 12,067,096 B2
(45) Date of Patent: Aug. 20, 2024

(54) INFORMATION PROCESSING SYSTEM, INFORMATION PROCESSING METHOD, AND NON-TRANSITORY COMPUTER-READABLE RECORDING MEDIUM

(71) Applicant: NEC Corporation, Tokyo (JP)

(72) Inventors: Yoshiteru Tomooka, Tokyo (JP); Akari Iwamoto, Tokyo (JP); Yuriko Yamazaki, Tokyo (JP); Shuuji Kikuchi, Tokyo (JP); Honami Yuki, Tokyo (JP); Hiroaki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 302 days.

(21) Appl. No.: 17/622,330

(22) PCT Filed: Jun. 26, 2020

(86) PCT No.: PCT/JP2020/025299
§ 371 (c)(1),
(2) Date: Dec. 23, 2021

(87) PCT Pub. No.: WO2021/260930
PCT Pub. Date: Dec. 30, 2021

(65) Prior Publication Data
US 2022/0415106 A1    Dec. 29, 2022

(51) Int. Cl.
*G06F 21/32* (2013.01)
*G06F 21/62* (2013.01)
*G07C 9/10* (2020.01)
*G07C 9/25* (2020.01)
*G06F 3/14* (2006.01)
*G06V 40/16* (2022.01)

(52) U.S. Cl.
CPC .......... *G06F 21/32* (2013.01); *G06F 21/6245* (2013.01); *G07C 9/10* (2020.01); *G07C 9/25* (2020.01); *G06F 3/14* (2013.01); *G06V 40/172* (2022.01); *G07C 2209/12* (2013.01)

(58) Field of Classification Search
CPC ...................................................... G06F 21/32
See application file for complete search history.

(56) References Cited

U.S. PATENT DOCUMENTS 10,460,187 B2 * 10/2019 Oda ....................... G06T 7/0002
2008/0195699 A1    8/2008 Min et al.
(Continued)

FOREIGN PATENT DOCUMENTS

JP    2008-537824 A    9/2008
JP    2014-222445 A    11/2014
(Continued)

OTHER PUBLICATIONS

International Search Report for PCT Application No. PCT/JP2020/025299, mailed on Sep. 24, 2020.
(Continued)

*Primary Examiner* — Bradley W Holder

(57) ABSTRACT

An information processing system acquires biological information of a target and generates output information determined in correspondence with identification information using the identification information associated with the biological information. Then, the output information is output.

9 Claims, 21 Drawing Sheets

(56) References Cited

U.S. PATENT DOCUMENTS

2014/0337949 A1* 11/2014 Hoyos ................ H04L 63/0853
                                                                             726/7
2018/0068101 A1* 3/2018 Kasilya Sudarsan ........................
                                                                            H04W 12/065
2019/0080072 A1* 3/2019 Van Os ................... G06F 3/016

FOREIGN PATENT DOCUMENTS

| JP | 2017-208638 A | 11/2017 |
| JP | 2017-224186 A | 12/2017 |

OTHER PUBLICATIONS

Extended European Search Report for EP Application No. 20941892.0, dated on Jun. 23, 2023.
Fayyadh Bilal Eid et al: "A New Password Authentication Mechanism Using 2D Shapes", 2018 8th International Conference on Computer Science and Information Technology (CSIT), IEEE, Jul. 11, 2018 (Jul. 11, 2018), pp. 113-118.

* cited by examiner

INFORMATION PROCESSING SYSTEM, INFORMATION PROCESSING METHOD, AND NON-TRANSITORY COMPUTER-READABLE RECORDING MEDIUM

This application is a National Stage Entry of PCT/JP2020/025299 filed on Jun. 26, 2020, the contents of all of which are incorporated herein by reference, in their entirety.

TECHNICAL FIELD

This disclosure relates to an information processing system, an information processing method, and a program.

BACKGROUND ART

In recent years, authentication technologies have been used in various places. When an authentication target is authenticated, an authentication device outputs information such as a result of the authentication of the authentication target to a display device or the like. As one example, in Patent Document 1, a technology for an authentication device performing authentication based on an iris to display an avatar image different from a face of a person who is an authentication target is disclosed. In addition, as a related technology, in Patent Document 2, a technology for displaying an avatar in accordance with login of a user is disclosed.

PRIOR ART DOCUMENTS

Patent Document

[Patent Document 1]
  Published Japanese Translation No. 2008-537824 of the PCT International Publication
[Patent Document 2]
  Japanese Unexamined Patent Application, First Publication No. 2017-208638

SUMMARY

Technical Problem

An object of this disclosure is to enhance the technologies disclosed in Patent Documents 1 and 2.

Solution to Problem

In order to solve the problem described above, an information processing system including: an acquisition means configured to acquire biological information of a target; a generation means configured to generate output information determined in correspondence with identification information using identification information associated with the biological information; and an output means configured to output the output information is provided.

In addition, an information processing method including: acquiring biological information of a target; generating output information determined in correspondence with identification information using the identification information associated with the biological information; and outputting the output information is provided.

Furthermore, a program causing a computer of an information processing system to function as: an acquisition means configured to acquire biological information of a target; a generation means configured to generate output information determined in correspondence with identification information using the identification information associated with the biological information; and an output means configured to output the output information is provided.

EXAMPLE EMBODIMENTS

An object of this disclosure is to enhance a technology disclosed in Patent Document 1.

In addition, when information about an authenticated target is displayed together with a result of authentication of the target authenticated by an authentication device, a technology of outputting information causing it to be more difficult to identify the authenticated target is desirable.

Figure 1:
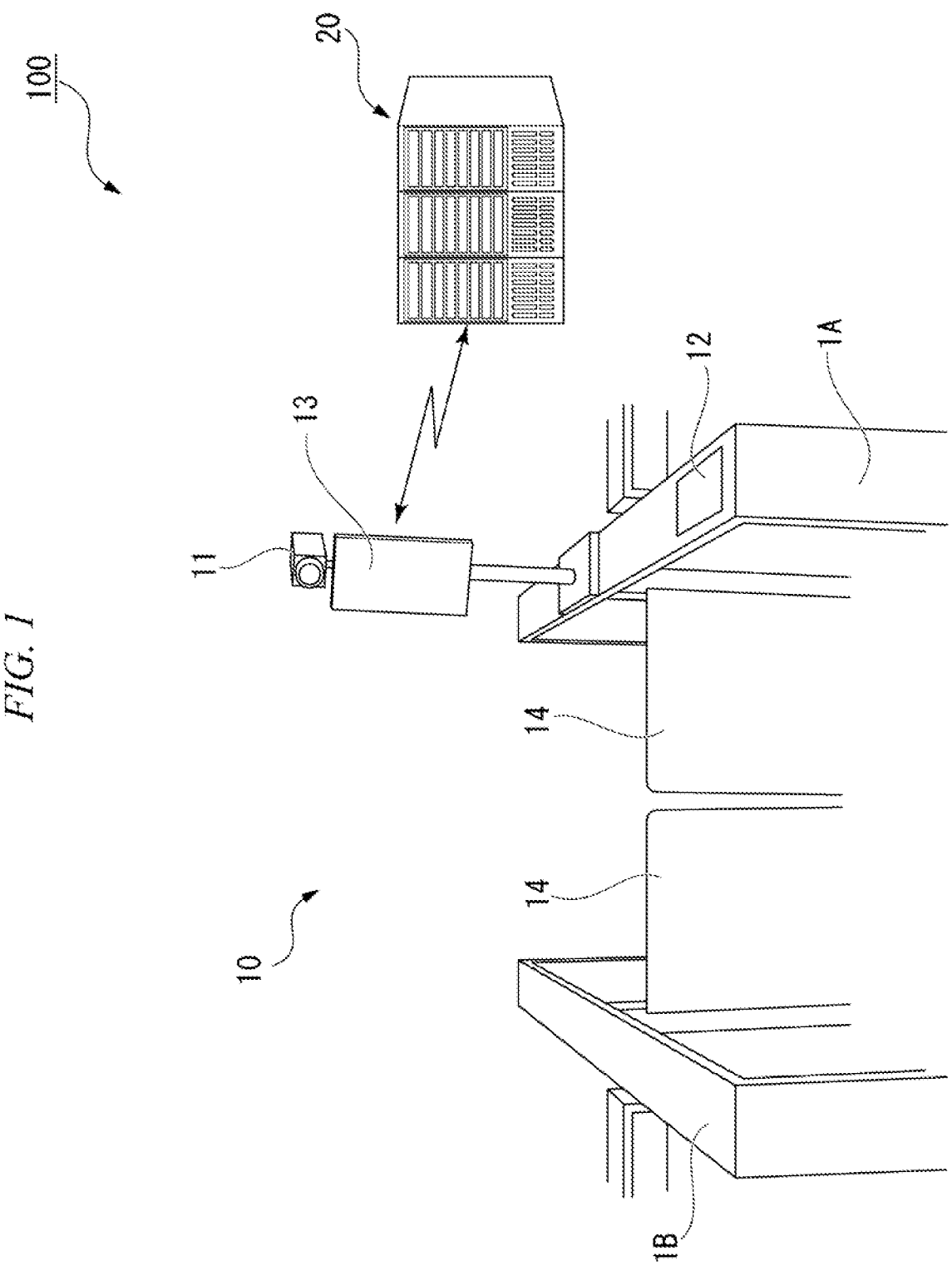
FIG. 1 is a first diagram illustrating an overview of an information processing system according to this disclosure.

FIG. 1 is a first diagram illustrating an overview of an information processing system according to a present example embodiment.

As illustrated in FIG. 1, the information processing system 100 is configured to include at least a gate device 10 and an information processing device 20. The gate device 10 and the information processing device 20 are connected via a communication network.

The gate device 10 is composed of one pair of gate main bodies 1A and 1B. The gate main bodies will be collectively referred to as a gate main body 1. Each gate main body 1 out of one pair of gate main bodies 1A and 1B is installed parallel with a gap of a width W of a passage area, through which authentication targets such as a person and the like that are mobile bodies passes, left empty. A person and the like that are authentication targets can pass through the passage area. The mobile bodies may be animals other than persons.

For example, the gate device 10 may be installed at a ticket barrier of a railway, a boarding gate of an airport, an entry/exit port of a company, and the like. In the present example embodiment, the gate device 10 includes at least a camera 11 (a biological information reading device), a code reader 12, and a display 13. The gate device 10 may include flappers 14 that block passage of a person or the like who is an authentication target through the gate device 10 in a case in which a result of authentication of the person or the like that is an authentication target is an authentication failure. Hereinafter, a case in which a target passing through the gate device 10 is a person will be described.

The camera 11 of the gate device 10 captures an image of a person passing through the gate device 10. The camera 11 transmits a captured image to the information processing device 20. The information processing device 20 performs authentication using feature information of a face of a person shown in the captured image. By using identification information of a person acquired based on the feature information, the information processing device 20 generates output information including information for determining the person in correspondence with the identification information and an authentication result.

The feature information is not limited to a face and may be an iris, a fingerprint, veins, a voice, an ear acoustic, an employee ID card, a mobile terminal of a user, a password, or the like. The gate device 10 may have a function for reading each modal such as an iris camera used for reading an iris, a fingerprint sensor used for reading a fingerprint, a microphone used for reading vocal sound, or the like. In other words, the gate device 10 may have a specification of multiple modals (a face+an iris and the like) having an interface form (multi-modals) reading a plurality of different pieces of biological information. In ear acoustic, there is a technology for transmitting a test sound in the direction of an ear hole (an external auditory meatus) of a person using an authentication device of an earphone type and measuring individuality from a reflected sound based on the individuality of a space structure of a head part including the ear hole (the external auditory meatus). The gate device 10 may have an ear acoustic authentication function for performing authentication based on the ear acoustic.

The information processing device 20 may generate output information including at least information for determining a person in correspondence with identification information of a target person. The information processing device 20 transmits the output information to the gate device 10. The gate device 10 displays the output information on the display 13.

In other words, the information processing device 20 includes an acquisition means that acquires biological information of a target. In addition, the information processing device 20 includes a generation means that generates output information determined in correspondence with identification information using the identification information associated with the biological information acquired by the acquisition means. In other words, the generation means generates output information that is uniquely determined in correspondence with identification information using the identification information associated with the biological information acquired by the acquisition means. The information processing device 20 includes an output means that outputs the output information.

In the present example embodiment, the output information representing information for determining a person is shape information for determining a person. Alternatively, in the present example embodiment, the output information representing information for determining a person may be color information for determining a person. In addition, in the present example embodiment, the output information representing information for determining a person may be a combination of shape information and color information for determining a person. Alternatively, in the present example embodiment, the output information representing information for determining a person may be a combination of a plurality of pieces of shape information, color information and information relating to the person for determining the person. For example, the information relating to a person may be a birthday, a part of an employee code, a mark of a birthplace, or the like. In addition, the information relating to a person may be information relating to a name of a target such as an initial of a name (for example, in a case in which the name is Nichiden Taro, it may be denoted as NT).

In the output information acquired by the gate device 10 from the information processing device 20, information for determining a person (shape information, color information, related information not directly representing a person, or a combination of a plurality of pieces of such information) is included. Thus, when the output information is displayed on the display 13, a person passing through the gate device 10 can notice that the output information is an output of information about him or her based on the output information. Further, an authentication result may be included in the output information, and thus a person passing through the gate device 10 can be made aware that the authentication result is an authentication result for him or her. On the other hand, it is difficult for another person other than a person passing through the gate device 10 to directly associate the displayed output information with the person passing through the gate device 10 even if the another person sees the output information displayed on the display 13. Thus, when output information including an authentication result and the like of a person passing through the gate device 10 is displayed on a display attracting attention, it is difficult to associate the output information with a person who is an authentication target, and thus the privacy of the person who is the authentication target can be protected.

Figure 2:
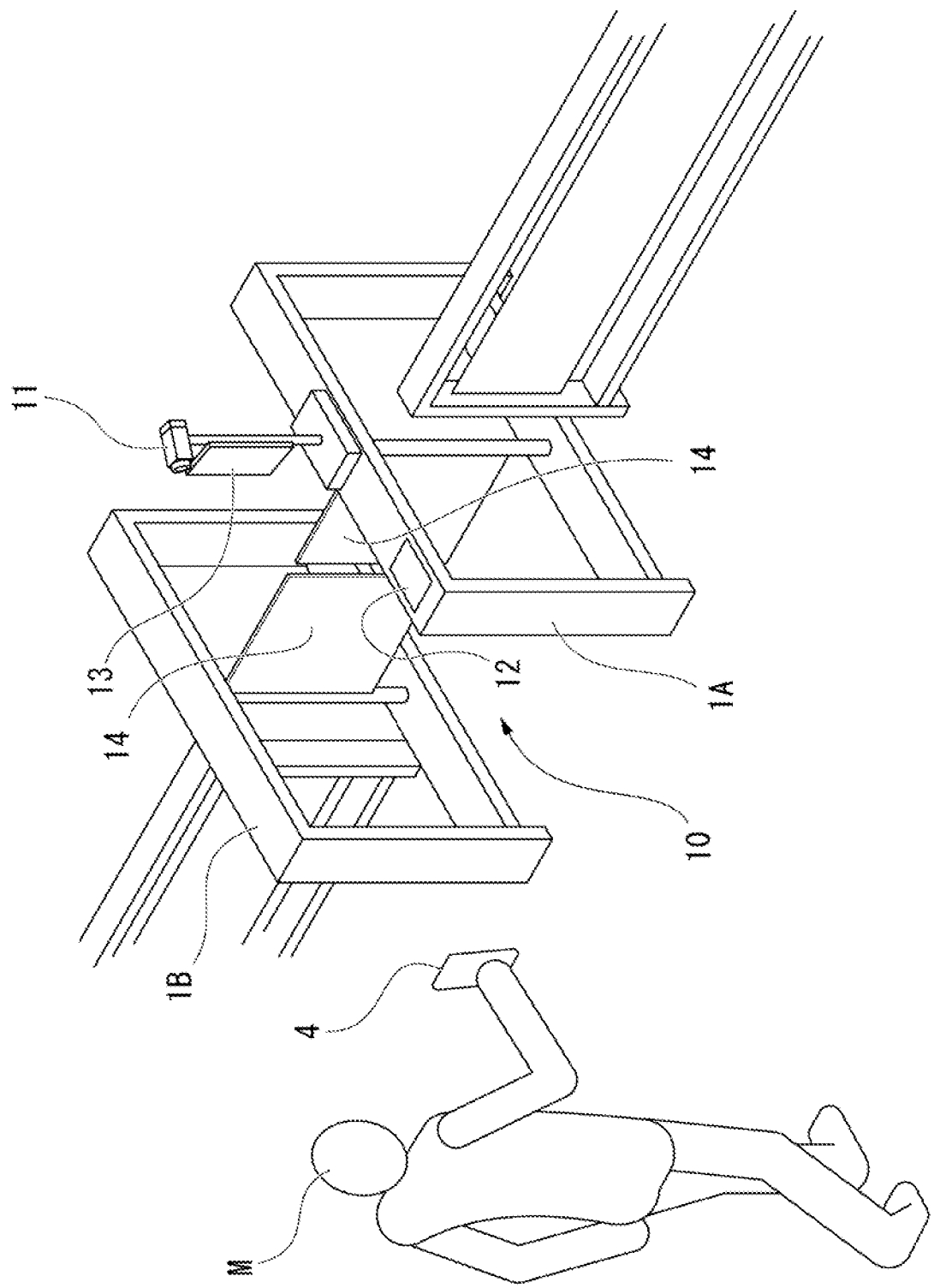
FIG. 2 is a second diagram illustrating an overview of the information processing system according to this disclosure.

FIG. 2 is a second diagram illustrating an overview of the information processing system according to the present example embodiment.

An output destination of the output information described above may be a mobile terminal 4 carried by a person M passing through the gate device 10. In such a case, the gate device 10 transmits the output information to the mobile terminal 4 carried by the person M. Alternatively, the information processing device 20 may be configured to directly transmit the output information to the mobile terminal 4 carried by the person M. By directly transmitting the output information from the information processing device 20 to the mobile terminal 4 carried by the person M, higher secrecy can be secured than that of an aspect in which output information is output to the display 13 of the gate device 10.

Figure 3:
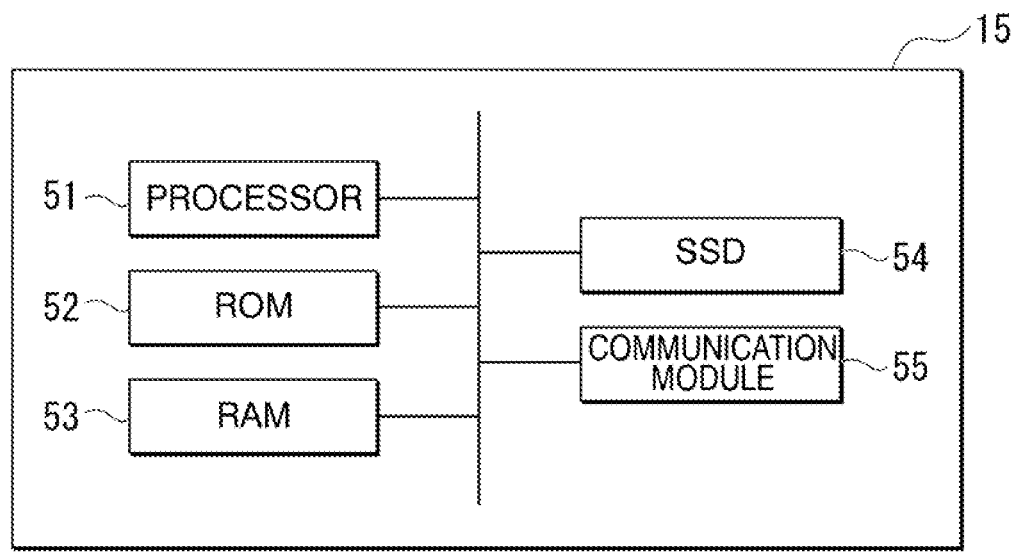
FIG. 3 is a diagram illustrating a hardware configuration of a gate control device according to this disclosure.

FIG. 3 is a diagram illustrating a hardware configuration of a gate control device included in the gate device according to the present example embodiment.

As illustrated in FIG. 3, a gate control device 15 is a computer having hardware components such as a processor 51 (a central processing unit (CPU), a graphics processing unit (GPU), a field programmable gate array (FPGA), a digital signal processor (DSP), an application specific integrated circuit (ASIC), or the like), a read only memory (ROM) 52, a random access memory (RAM) 53, a solid state drive (SSD) 54, a communication module 55, and the like.

Figure 4:
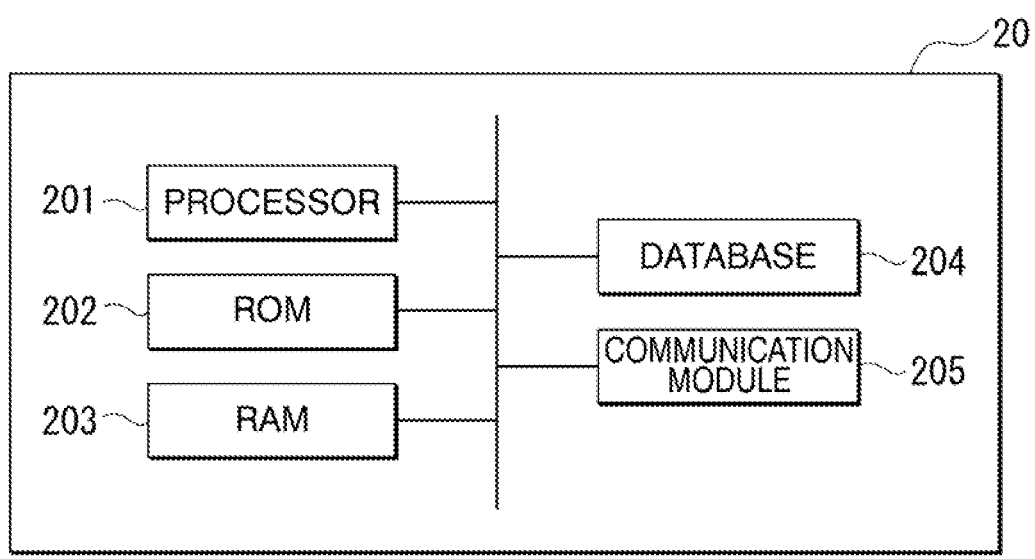
FIG. 4 is a diagram illustrating a hardware configuration of an information processing device according to this disclosure.

FIG. 4 is a diagram illustrating a hardware configuration of an information processing device according to the present example embodiment.

As illustrated in FIG. 4, an information processing device 20 is a computer having hardware components such as a processor 201 (a central processing unit (CPU), a graphics processing unit (GPU), a field programmable gate array (FPGA), a digital signal processor (DSP), an application specific integrated circuit (ASIC), or the like), a read only memory (ROM) 202, a random access memory (RAM) 203, a database 204, a communication module 205, and the like.

Figure 5:
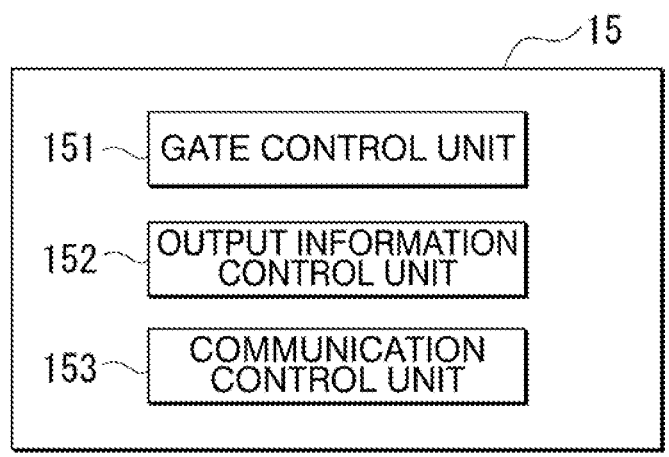
FIG. 5 is a diagram illustrating a functional configuration of the gate control device according to this disclosure.

FIG. 5 is a diagram illustrating a functional configuration of the gate control device.

By causing a gate control program to be executed by the CPU 51, the gate control device 15 exhibits functions of a gate control unit 151, an output information control unit 152, and a communication control unit 153.

The gate control unit 151 controls the gate device 10. The output information control unit 152 controls output of information acquired from the information processing device 20 to an output device such as a display 13 and a mobile terminal 4. The communication control unit 153 controls communication with other devices.

Figure 6:
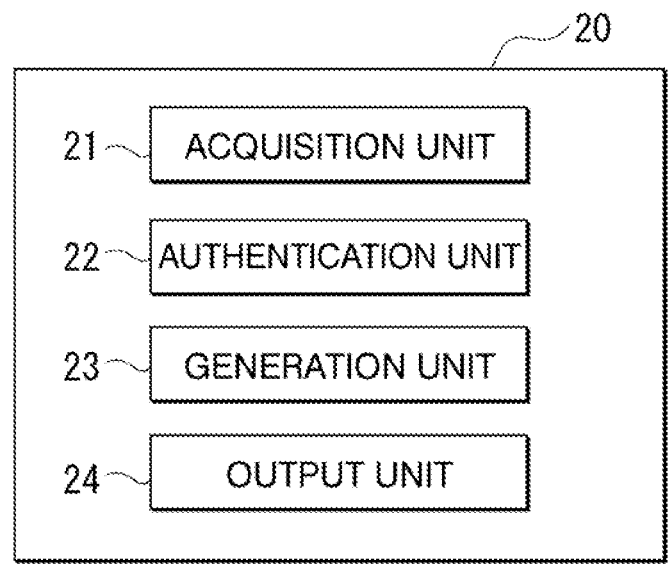
FIG. 6 is a diagram illustrating a functional configuration of the information processing device according to this disclosure.

FIG. 6 is a diagram illustrating a functional configuration of the information processing device.

By causing the CPU 21 to execute an information processing program, the information processing device 20 exhibits functions of an acquisition unit 21, an authentication unit 22, a generation unit 23, and an output unit 24.

The acquisition unit 21 acquires biological information of persons and the like that are targets.

The authentication unit 22 performs authentication using biological information of persons and the like that are targets.

The generation unit 23 generates output information determined in correspondence with identification information using the identification information associated with biological information of a person or the like that is a target.

The output unit 24 outputs the output information.

In addition, the generation unit 23 generates output information determined in correspondence with identification information using the identification information of a person or the like that is a target and an output information generation algorithm.

It is assumed that identification information of a person or the like that is a target represents a plurality of character rows, and the output information generation algorithm is an algorithm of generating output information by shapes determined in accordance with characters and positions of the characters in a row or by combining the shapes with colors. In this case, the generation unit 23 generates output information by shapes determined in accordance with characters and positions of the characters in a row or by combining the shapes with colors. This process may be one aspect of process of the generation unit 23.

The generation unit 23 may acquire related information relating to a target associated with identification information of a person or the like that is a target and generate output information further including the related information.

In recent years, use of security gates using face authentication has increased. As a method for notifying a person to pass through the gate device 10 of a success of identity authentication through the display 13 installed in the gate device 10, there is a method of displaying only notification details indicating a success of authentication or a failure of authentication, a method of notifying identity authentication in more understandable manner by displaying a live view together with display of notification details indicating a success of authentication or a failure of authentication in combination with a face image of the person, or the like.

In the case of the method of displaying only notification details indicating a success of authentication or a failure of authentication, information that can be used for checking the identity is not displayed, and thus even in a case in which a person is erroneously recognized as another person, there is no means for the person to be made aware of this fact.

In the case of the method of displaying a live view together with display of notification details indicating a success of authentication or a failure of authentication in combination with a face image of the person, the face image is displayed, and thus the identity can be checked, and a user has a physiological burden such as shame in accordance with display of his or her face being displayed on the screen in a public space in which other persons are present in the vicinity.

In consideration of such a problem, it also becomes an issue how a physiological burden of a user can be reduced while realizing the function of being able to confirm authentication of the user in development of a security gate and the like in biometric authentication such as face authentication.

First Example Embodiment

Figure 7:
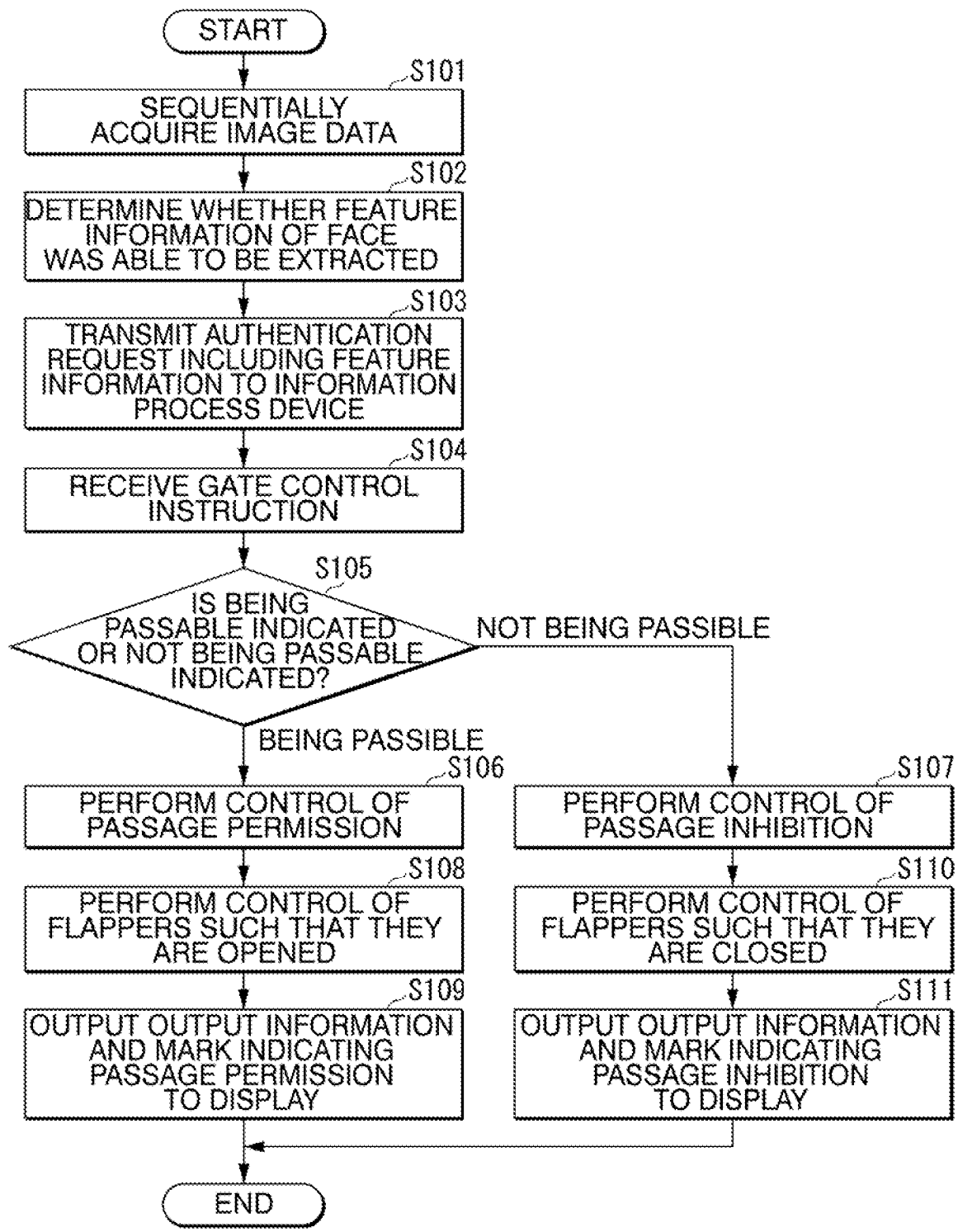
FIG. 7 is a first diagram illustrating a processing flow of a gate device according to a first example embodiment of this disclosure.

FIG. 7 is a first diagram illustrating a processing flow of a gate device according to a first example embodiment.

Figure 8:
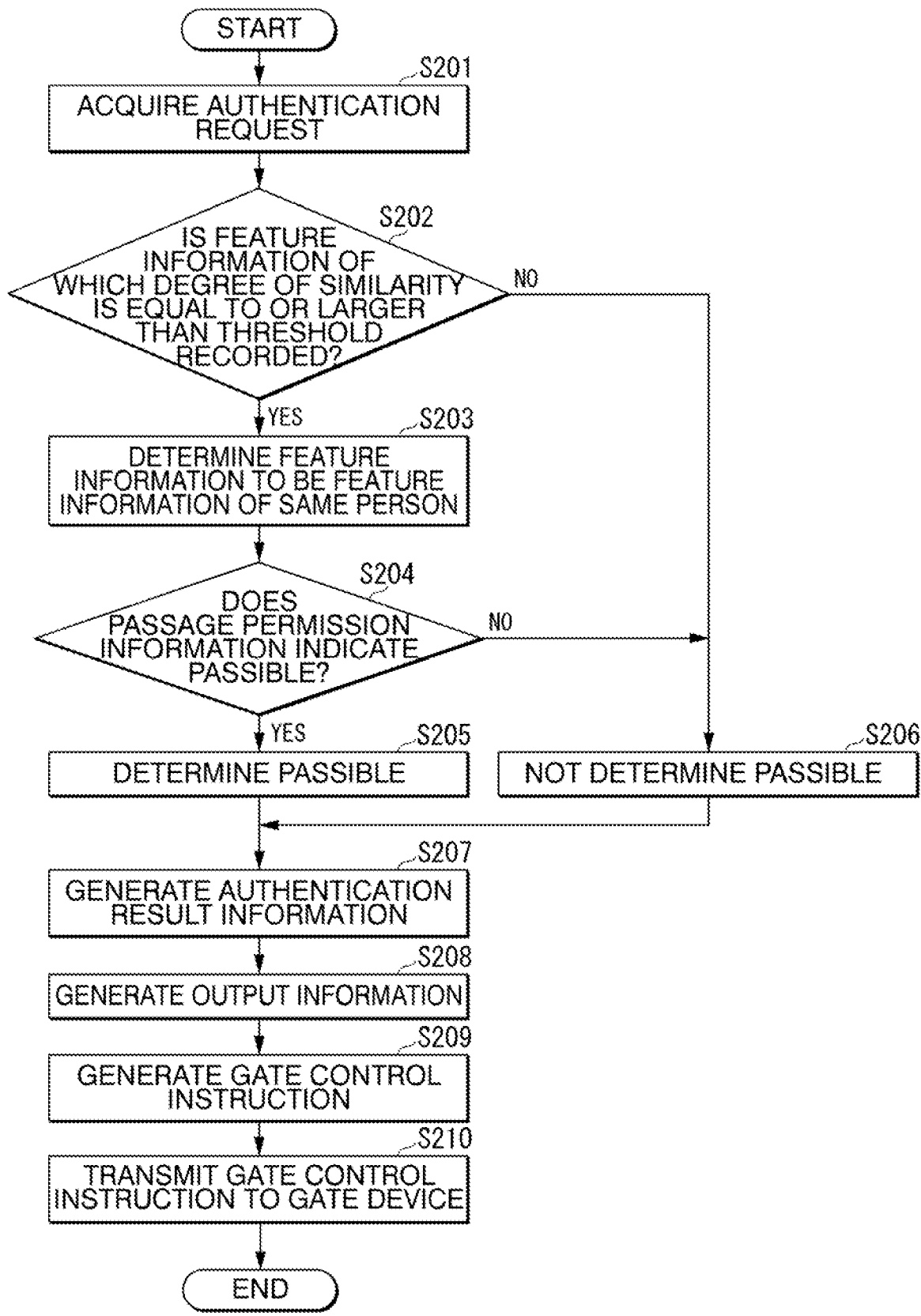
FIG. 8 is a first diagram illustrating a processing flow of an information processing device according to the first example embodiment of this disclosure.

FIG. 8 is a first diagram illustrating a processing flow of an information processing device according to the first example embodiment.

Hereinafter, a process according to an example embodiment will be described in accordance with a sequence.

A user approaches the gate main body 1. The gate control unit 151 of the gate control device 15 sequentially acquires image data including images captured by the camera 11 of the gate main body 1 (Step S101). When the image data is acquired, the gate control unit 151 starts to extract feature of a face shown in the images represented by the image data. In the acquired image data, an identifier of the gate main body 1 including the camera 11 that has transmitted the image data is assumed to be stored.

The gate control unit 151 determines whether feature information of a face of a person was able to be extracted from the images included in the image data (Step S102). In a case in which feature information of a face was able to be extracted, the gate control unit 151 transmits an authentication request including the feature information to the information processing device 20 (Step S103). In the authentication request, an identifier representing the gate main body 1, a network address of the gate control device 15, and the like may be included in addition to the feature information of a face of a user.

The information processing device 20 stores feature information of a face, passage permission information, and the like registered in advance by a user of the gate device 10 in the database 204 or the like in association with each other. The passage permission information may be an information group and the like of identification information of the gate device 10 through which a user can pass.

The acquisition unit 21 of the information processing device 20 acquires an authentication request (Step S201). The authentication unit 22 calculates the degree of similarity between the feature information of a face included in the authentication request and feature information of each of a plurality of faces recorded in the database 104 and determines whether feature information of which the degree of similarity is equal to or larger than a predetermined threshold is recorded in the database 104 (Step S202).

In a case in which feature information of a face of which the degree of similarity with the feature information included in the authentication request is equal to or larger than a predetermined threshold is registered in the database 204, the authentication unit 22 determines feature information having the highest degree of similarity as feature information of the same person as the user represented by the feature information included in the authentication request (Step S203).

The authentication unit 22 acquires passage permission information recorded in the database 104 in association with feature information of the same person as the user. The authentication unit 22 determines whether the passage permission information indicates passable (Step S204). As an example, the authentication unit 22 determines whether information of an identifier of the gate device 10 included in the authentication request is registered in the database 204 in association with the passage permission information associated with the feature information of the same person as the user. In a case in which information of an identifier of the gate device 10 included in the authentication request is registered in the database 204 in association with the passage permission information associated with the feature information of the same person as the user, the authentication unit 22 determines that the user is passable (Step S205).

On the other hand, in a case in which feature information of which degree of similarity is equal to or larger than a predetermined threshold is not recorded in the database 204 or a case in which passage permission information associated with the feature information of the same person as the user and the information of the identifier of the gate device 10 included in the authentication request are not registered in the database 204 in association with each other, the authentication unit 22 determines that the user is not passable (Step S206). The authentication unit 22 generates authentication result information indicating passable or not passable (Step S207).

In addition, the authentication unit 22 acquires an ID of the user registered in the database 204 in association with the feature information of the same person as the user. When authentication result information is generated, the authentication unit 22 outputs a process start instruction including the ID of the user to the generation unit 23. The user ID may be an employee number, a student ID number, a room number of an apartment, or the like.

The generation unit 23 acquires an ID of a user based on the process start instruction. It is assumed that the ID of the user is represented in a number string of 10 digits. The generation unit 23 acquires a number string of the last four digits of the 10-digit number string based on the ID of the user. The generation unit 23 generates output information determined in correspondence with the ID of the user using the four-digit number string and an output information generation algorithm (Step S208). It is assumed that the output information is information that represents a shape.

The output unit 24 acquires the authentication result information generated by the authentication unit 22 and the output information generated by the generation unit 23. The output unit 24 generates a gate control instruction including the authentication result information and the output information (Step S209). The output unit 24 acquires a network address of the gate device 10 that is included in the authentication request. The output unit 24 transmits the gate control instruction addressed to the acquired network address (Step S210).

The gate control device 15 of the gate device 10 receives the gate control instruction (Step S104). The gate control unit 151 of the gate control device 15 acquires the authentication result information included in the gate control instruction. The output information control unit 152 of the gate control device 15 acquires the output information included in the gate control instruction. The gate control unit 151 determines whether information included in the authentication result information indicates passable or not passable (Step S105). In a case in which the information indicating passable is included in the authentication result information, the gate control unit 151 performs control of passage permission (Step S106). In a case in which the information indicating non-passible is included in the authentication result information, the gate control unit 151 performs control of passage inhibition (Step S107).

When the control of passage permission is determined to be performed, the gate control unit 151 outputs information indicating passage permission to the output information control unit 152. In addition, the gate control unit 151 performs control such that the flappers 14 of the gate device 10 are opened (Step S108). In accordance with this, a passage area of the gate device 10 is opened. In addition, when information indicating passage permission is acquired, the output information control unit 152 outputs the output information and a mark indicating passage permission to the display 13 (Step S109). In accordance with this, the output information determined in correspondence with an ID of a user passing through the gate device 10 and the mark indicating passage permission are displayed on the display 13. A user recognizes that passage is permitted based on the mark indicating passage permission and recognizes that the passage permission is for him or her by recognizing that the passage permission is output information determined in accordance with an ID of the user by visually recognizing the output information. Then, the user passes through the gate device 10.

When the control of passage inhibition is determined to be performed, the gate control unit 151 outputs information indicating passage inhibition to the output information control unit 152. In addition, the gate control unit 151 performs control of the flappers 14 of the gate device 10 such that they are closed (Step S110). In accordance with this, the passage area of the gate device 10 is closed. In addition, when information indicating passage inhibition is acquired, the output information control unit 152 outputs the output information and a mark indicating passage inhibition to the display 13 (Step S111). In accordance with this, the output information determined in accordance with an ID of a user passing through the gate device 10 and the mark indicating passage inhibition are displayed on the display 13. A user recognizes that passage is inhibited based on the mark indicating passage inhibition and recognizes that the passage inhibition is for him or her by recognizing that the passage inhibition is output information determined in accordance with an ID of the user by visually recognizing the output information. Then, the user does not pass through the gate device 10 and performs an inquiry or the like with a nearest manager. In addition, information indicating a reason for determination of inhibition (a blurred face, a too distant face, or the like) identified by the authentication unit 22 may be included in the authentication result information, and the output information control unit 152 may output this information. In a case in which a reason for determination of inhibition is output to a display of the gate device 10, the output information control unit 152 may output personal information, a face image of the user, and the like with being hidden. On the other hand, in a case in which a reason for determination of inhibition is output to the mobile terminal 4, the securement of confidentiality is high, and thus the output information control unit 152 may perform control such that output is performed with personal information, a face image of the user, and the like included.

Figure 9:
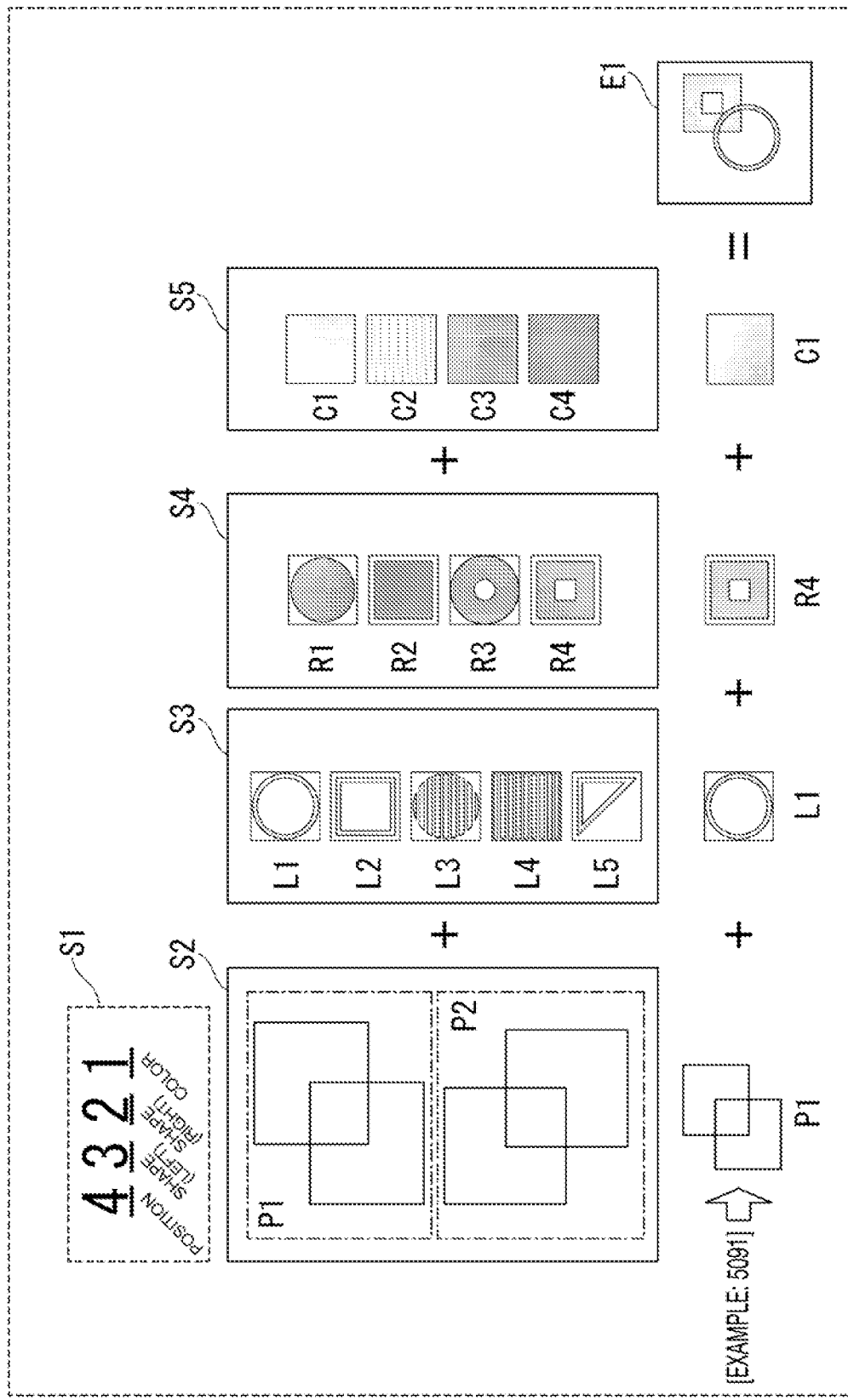
FIG. 9 is a diagram illustrating an example of generation of output information according to this disclosure.

FIG. 9 is a diagram illustrating an example of generation of output information. Next, a first specific example of a process of generating output information determined in correspondence with an ID of a user who is an authentication target using the generation unit 23 of the information processing device 20 will be described.

The generation unit 23 acquires an ID of a user based on a process start instruction. As described above, as an example, the ID of the user is represented as a number string of 10 digits, and the generation unit 23 acquires a number string (S1) of the last four digits of the corresponding 10-digit number based on the ID of the user.

The generation unit 23 identifies, for example, a relation (S2) of left/right display positions of two shapes based on a fourth-digit number in the number string (S1).

Specifically, in the process of identifying the relation (S2) of the left/right display positions of two shapes based on a fourth-digit number, the generation unit 23 identifies one of a first display position pattern P1 and a second display position pattern P2. In a case in which the fourth-digit number represents 0 to 4, the generation unit 23 identifies a relation (S2) of the left/right display positions of two shapes represented by the first display position pattern P1. In a case in which the fourth-digit number represents 5 to 9, the generation unit 23 identifies a relation (S2) of the left/right display positions of two shapes represented by the second display position pattern P2. This process is one aspect of process of identifying the position of a shape represented by the output information using the generation unit 23 in accordance with a character and the position of the character in a character string based on the character string represented by an ID of the user.

Next, the generation unit 23 identifies a shape (S3) displayed on a position on the left side in the relation of the left/right display positions of two shapes that is identified in (S2) based on a third-digit number in the number string (S1).

Specifically, in the process of identifying a shape (S3) displayed at the position of the left side based on the third-digit number, the generation unit 23 identifies one of a left first shape L1, a left second shape L2, a left third shape L3, a left fourth shape L4, and a left fifth shape L5. In a case in which the third-digit number is 0 or 1, the generation unit 23 identifies the left first shape L1. In a case in which the third-digit number is 2 or 3, the generation unit 23 identifies the left second shape L2. In a case in which the third-digit number is 4 or 5, the generation unit 23 identifies the left third shape L3. In a case in which the third-digit number is 6 or 7, the generation unit 23 identifies the left fourth shape L4. In a case in which the third-digit number is 8 or 9, the generation unit 23 identifies the left fifth shape L5.

The generation unit 23 identifies a shape (S4) displayed at a position of the right side in the relation of left/right display positions of two shapes identified in (S2) based on a second-digit number in the number string (S1).

Specifically, in the process of identifying a shape (S4) displayed at the position of the right side based on the second-digit number, the generation unit 23 identifies one of a right first shape R1, a right second shape R2, a right third shape R3, and a right fourth shape R4. In a case in which the second-digit number is 0 or 1, the generation unit 23 identifies the right first shape R1. In a case in which the second-digit number is 2 or 3, the generation unit 23 identifies the right second shape R2. In a case in which the second-digit number is one of 4 to 6, the generation unit 23 identifies the right fourth shape R4. In a case in which the second-digit number is one of 7 to 9, the generation unit 23 identifies the right fourth shape R4.

The generation unit 23 identifies a color (S5) in which a shape identified in (S3) is colored based on the first-digit number in the number string (S1).

Specifically, the generation unit 23 identifies one of first color information C1, second color information C2, third color information C3, and fourth color information C4 in the process of identifying a color (S5) in which the shape identified in (S3) is colored based on the first-digit number. The generation unit 23 identifies the first color information C1 in a case in which the first-digit number is 0 or 1. The generation unit 23 identifies the second color information C2 in a case in which the first-digit number is 2 or 3. The generation unit 23 identifies the third color information C3 in a case in which the first-digit number is one of 4 to 6. The generation unit 23 identifies the fourth color information C4 in a case in which the first-digit number is one of 7 to 9.

Then, the generation unit 23 generates shape information μl, in which a shape (S3) displayed at the position of the left side and a shape (S4) displayed at the position of the right side are disposed based on the relation (S2) of left/right display positions of two shapes, colored in a color (S5) in which the shape of the left side identified in (S3) is colored as output information.

In the technique for generating the shape information described above, there are two types to be identified as relations (S2) of left/right display positions of two shapes. In the relation of left/right display positions of two shapes, there are five types of identifying shapes (S3), which are displayed at the position of the left side. In the relation of left/right display positions of two shapes, there are four types of identifying shapes (S4), which are displayed at the position of the right side. There are four types of identifying colors (S5), in which the shape identified in (S3) is colored. Thus, in the technique for generating the shape information described above, the information processing device 20 can generate shape information of 160 types as output information.

The process of sequentially identifying the information represented in S1, S2, S3, S4, and S5 described above is a process that is performed by the generation unit 23 of the information processing device 20 using the output information generation algorithm.

The generation unit 23 may identify shape information as output information using another output information generation algorithm. For example, the output information generation algorithm may be an algorithm identifying the first four digits rather than the last four digits at the time of identifying a number string from the ID described above, and the generation unit 23 may identify a number string based on this algorithm.

In addition, in a case in which a character strings of alphabet, hiragana, katakana, Chinese characters, and the like are included in an ID of a user of the gate device 10, the output information generation algorithm may be an algorithm identifying the character string including the alphabet, hiragana, katakana, Chinese characters, and the like instead of a number string, and the generation unit 23 may identify a character string of mixed characters of numbers, alphabet, hiragana, katakana, Chinese characters, and the like instead of a number string based on this algorithm.

In addition, the output information generation algorithm may be an algorithm identifying a number string or a character string of five digits or more based on an ID of a user of the gate device 10, and the generation unit 23 may identify a character string or a number string based on this algorithm.

Furthermore, the output information generation algorithm may be an algorithm identifying a display position of one shape or a relation of display positions of some of three or more shapes instead of identifying the relation (S2) of left/right display positions of two shapes.

In addition, the output information generation algorithm may be an algorithm identifying shapes to be displayed at specific positions in a relation of display positions of some of shapes from among shapes of which the number is other than 5 instead of identifying the shape (S3) displayed at the position of the left side.

Furthermore, the output information generation algorithm may be an algorithm identifying shapes to be displayed at remaining display positions in a relation of display positions of some of shapes from among shapes of which the number is other than 4 instead of identifying the shape (S4) displayed at the position of the right side.

In addition, the output information generation algorithm may be an algorithm identifying one of colors of which the number is other than 4 for at least one shape that has been identified.

Figure 10:
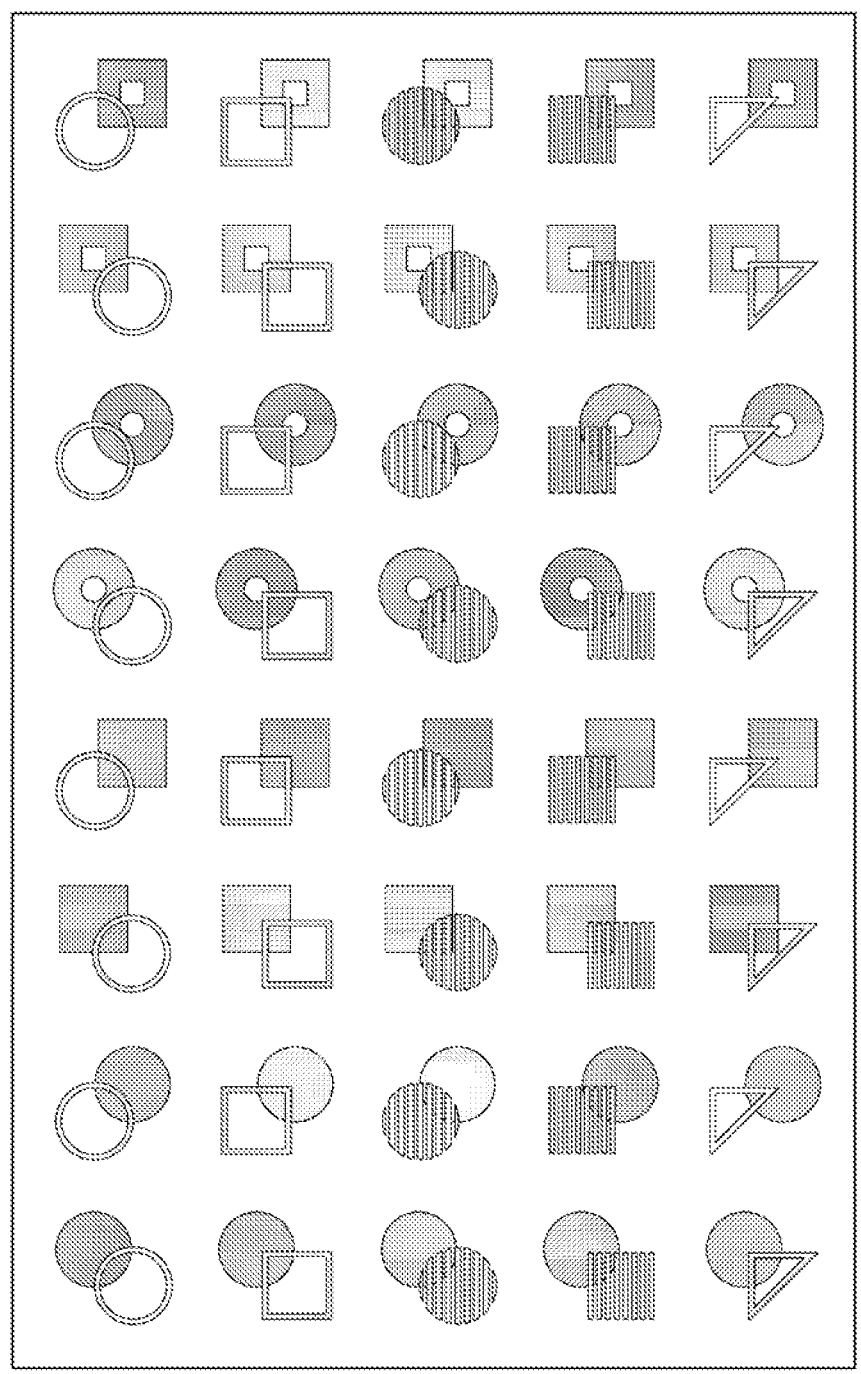
FIG. 10 is a diagram illustrating an example of shapes represented by output information according to this disclosure.

FIG. 10 is a diagram illustrating an example of shapes represented by output information.

By identifying the shapes of S2 to S4 as illustrated in FIG. 9, 40 types of shapes as illustrated in FIG. 10 can be generated. In addition, as illustrated in S4, by identifying one of a plurality of colors for such a shape, display information according to combinations of more shapes and colors can be generated.

Figure 11:
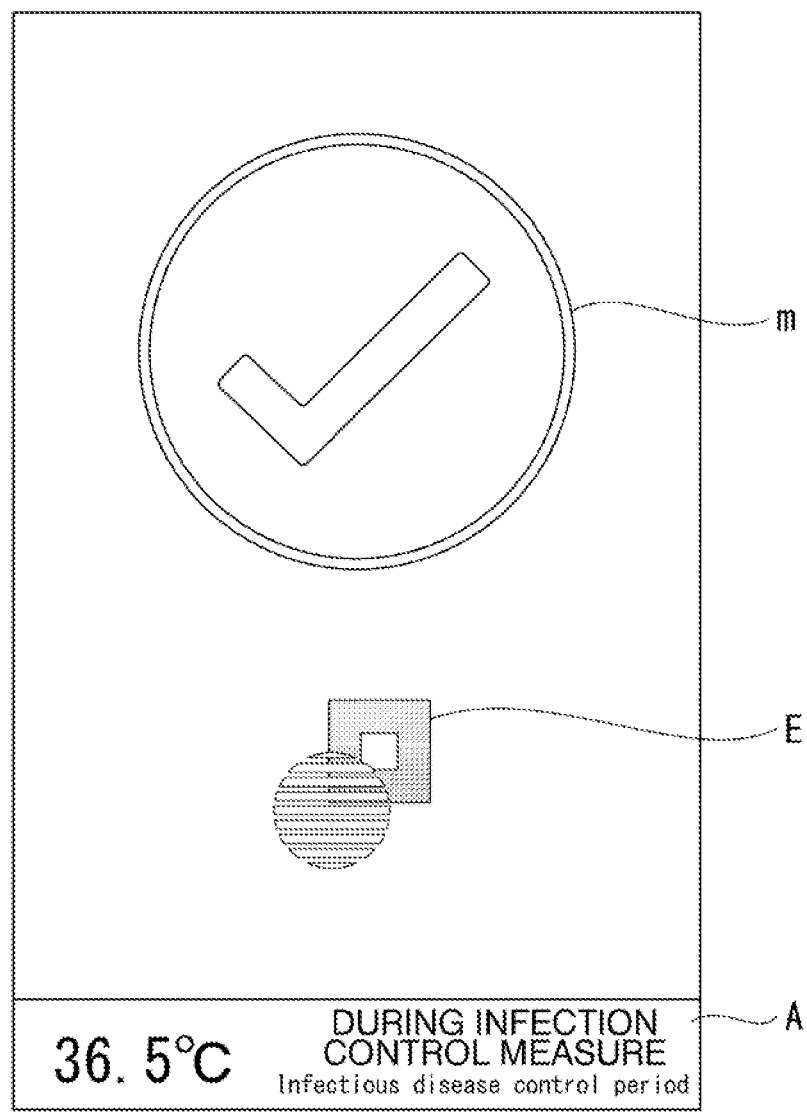
FIG. 11 is a diagram illustrating an example of display of a gate device according to this disclosure.

FIG. 11 is a diagram illustrating an example of display of the gate device.

The gate device 10 displays a mark m indicating passage permission and output information E representing a shape determined in accordance with an ID of a user of the gate device 10 that is an authentication target to be aligned as illustrated in FIG. 11 on the display 13. As illustrated in FIG. 10, the gate device 10 may add additional information A and output the additional information A together with the output information E.

For example, a sensor detecting a surface temperature of a face of a user may be included in the gate device 10, and the gate control unit 151 of the gate control device 15 may add the surface temperature of the face of the user acquired from the sensor to the additional information A as a body temperature of the user and output the additional information. In accordance with this, the user can perceive his or her body temperature at the time of passing through the gate device 10. In a case in which an area that a user enters at the time of passing through the gate device 10 is regulated to prohibit entrance in the case of a predetermined body temperature, by checking the additional information A displayed on the display 13 by the gate device 10, the user can determine whether he or she is allowed to enter the area.

In addition, in a case in which the body temperature of a user is equal to or higher than a predetermined temperature, the gate control unit 151 may perform control of passage inhibition. In other words, the gate control unit 151 checks whether the body temperature of a user is equal to or higher than a predetermined temperature. In a case in which the body temperature of the user is equal to or higher than the predetermined temperature, the gate control unit 151 performs control of passage inhibition regardless of a result of determination representing whether the authentication result information indicates passable or not passable based on the authentication result information included in the gate control instruction. The control of passage inhibition may be similar to the process described above. The gate control unit 151 may determine whether or not a user is wearing a mask based on a captured image and, in a case in which the user is not wearing a mask, may output information for urging wearing of a mask or perform control of passage inhibition.

In addition, it is assumed that the gate control unit 151 acquires information to be displayed as additional information A from the information processing device 20 in advance and temporarily stores the information. In this case, the output information control unit 152 displays the information that is temporarily stored with the additional information A. For example, the additional information A may be any information such as a current situation of an area for which entrance is classified by the gate device 10, precaution for the area, countermeasure information. For example, in a case in which "an infection control measure is being performed" in the area, the output information control unit 152 may display characters or sentences indicating that.

Second Example Embodiment

Figure 12:
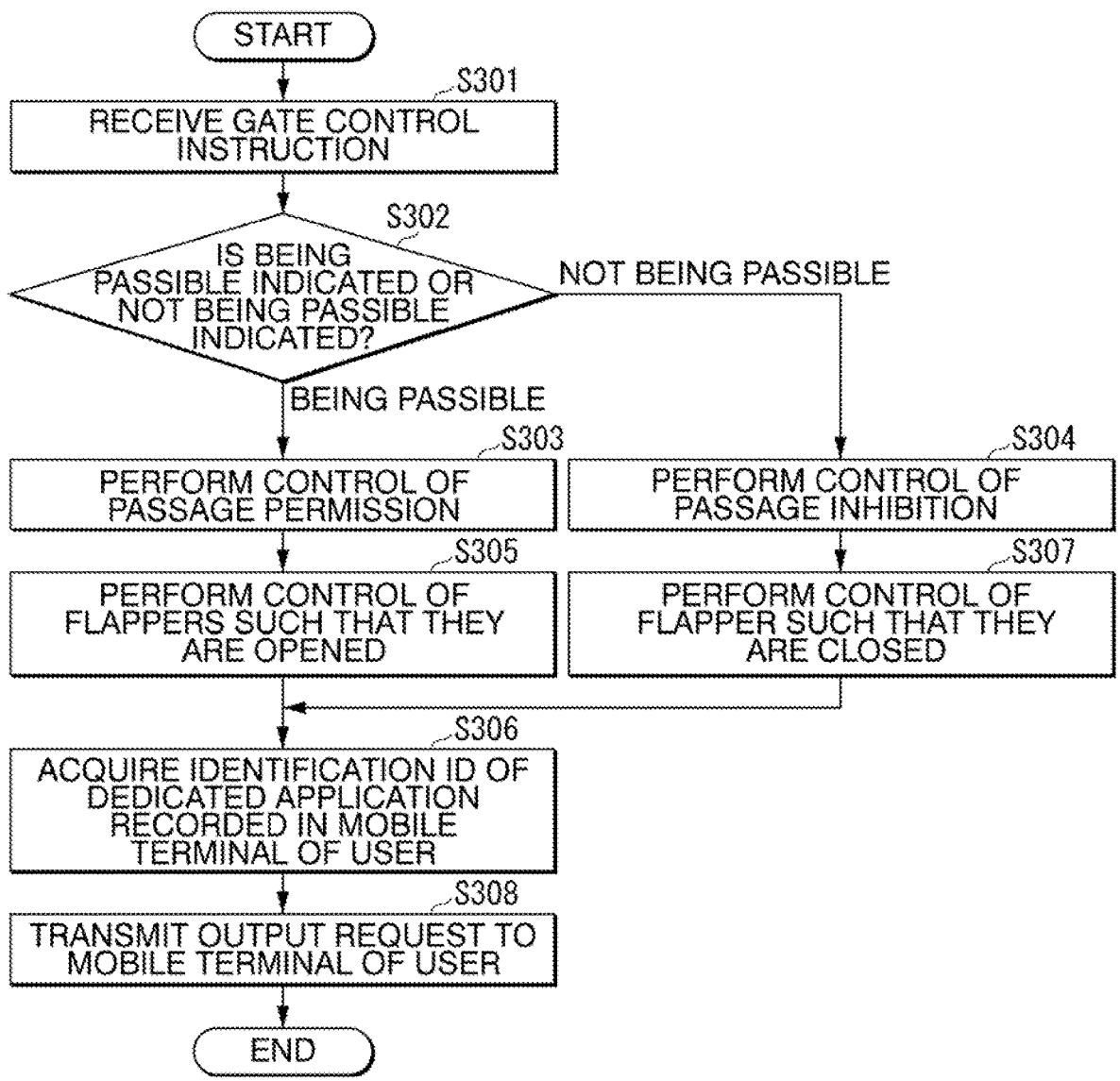
FIG. 12 is a diagram illustrating a processing flow of a gate device according to a second example embodiment of this disclosure.

FIG. 12 is a diagram illustrating a processing flow of a gate device according to a second example embodiment.

Similar to the first example embodiment, when a gate passage instruction is received from an information processing device 20, the gate device 10 may perform the following process instead of the process described in the first example embodiment. Specifically, a gate control unit 151 of the gate device 10 receives a gate control instruction (Step S301). The gate control unit 151 of the gate control device 15 acquires authentication result information included in the gate control instruction. An output information control unit 152 of the gate control device 15 acquires output information included in the gate control instruction. The gate control unit 151 determines whether information included in the authentication result information indicates passable or not passable (Step S302). In a case in which information indicating passable is included in the authentication result information, the gate control unit 151 performs control of passage permission (Step S303). In a case in which information indicating not passable is included in the authentication result information, the gate control unit 151 performs control of passage inhibition (Step S304).

When the control of passage permission is determined to be performed, the gate control unit 151 outputs information indicating passage permission to the output information control unit 152. In addition, the gate control unit 151 performs control of flappers 14 of the gate device 10 such that they are opened (Step S305). In accordance with this, a passage area of the gate device 10 is opened. In addition, when information indicating passage permission is acquired, the output information control unit 152 acquires an identification ID (output destination information) of a dedicated application recorded in a mobile terminal 4 of a user that is a transmission destination of an output request including output information and a mark indicating passage permission (Step S306).

For example, the identification ID of the dedicated application recorded in the mobile terminal 4 of the user may be included in a gate control instruction received from the information processing device 20. The information processing device 20 may read an identification ID of the dedicated application recorded in the mobile terminal 4 of the user, which is recorded in a database 204 in association with an ID of a user to pass through the gate device 10, store the identification ID of the dedicated application in the gate control instruction, and transmit the gate control instruction to the gate device 10. In accordance with this, the output information control unit 152 can acquire the identification ID of the dedicated application recorded in the mobile terminal 4 of the user from the gate control instruction.

When the control of passage inhibition is determined to be performed, the gate control unit 151 outputs information indicating passage inhibition to the output information control unit 152. In addition, the gate control unit 151 performs control of the flappers 14 of the gate device 10 such that they are closed (Step S307). In accordance with this, the passage area of the gate device 10 becomes closed. In addition, when information indicating passage inhibition is acquired, the output information control unit 152 acquires an identification ID of a dedicated application recorded in the mobile terminal 4 of the user, which is a transmission destination of an output request including output information and a mark indicating passage inhibition (Step S306).

The output information control unit 152 transmits an output request including the identification ID of the dedicated application of the mobile terminal 4 of the user, the output information, and the mark indicating passage permission or passage inhibition (Step S308).

A user, for example, is assumed to activate a dedicated application for passing through the gate device 10 that is recorded in the mobile terminal 4 at the time of passing through the gate device 10 in advance before passing through the gate device 10. In accordance with this, the mobile terminal 4 waits for reception of an output request received by the dedicated application. When approaching the gate device 10, the mobile terminal 4 is connected to the gate device 10 to be able to communicate therewith. The mobile terminal 4 receives an output request from the gate device 10.

When an output request is received from the gate device, the mobile terminal 4 acquires output information and a mark indicating passage permission included in the output request. The mobile terminal 4 displays output information determined in correspondence with the ID of the user passing through the gate device 10 and a mark indicating passage permission on the display of the mobile terminal.

In accordance with this, a user to pass through the gate device 10 can recognize that passage is permitted based on the mark indicating passage permission using his or her mobile terminal 4. In addition, a user visually recognizes output information and checks that the passage permission is for the user by recognizing that the passage permission is the output information determined in accordance with his or her own ID.

A user passes through the gate device 10. The user may cause a code reader 12 to read settlement code information displayed on a dedicated application screen activated by the mobile terminal 4 at the time of passing through the gate device 10 and perform settlement at the time of passing through the gate device 10. The gate control unit 151 of the gate control device 15 acquires the settlement code information from the code reader 12. The gate control unit 151 may perform a settlement process for passage using a known technology using information for settlement, which is included in the settlement code information, of a user to pass through the gate device 10.

When an output request is received from the gate device, the mobile terminal 4 is assumed to acquire output information and a mark indicating passage inhibition included in the output request instead of acquiring output information and a mark indicating passage permission included in the output request. In this case, the mobile terminal 4 displays output information determined in accordance with an ID of a user passing through the gate device 10 and the mark indicating passage inhibition on the display of the mobile terminal.

In accordance with this, the output information determined in accordance with the ID of the user passing through the gate device 10 and the mark indicating passage inhibition are displayed on a display 13. A user to pass through the gate device 10 can recognize that passage has been permitted based on the mark indicating passage inhibition using his or her mobile terminal 4. In addition, the user recognizes that the passage inhibition is output information determined in accordance with his or her ID by visually recognizing the output information and checks that the passage inhibition is for the user. Then, the user does not pass through the gate device 10 and performs an inquiry or the like with a nearest manager. By directly transmitting output information to the mobile terminal 4, higher confidentiality can be secured than in an aspect in which output information is output to the display 13 of the gate device 10. In addition, the gate device 10 may additionally perform a process of outputting output information to the display 13 of the gate device 10, which is similar to the first example embodiment, together with outputting the output information to the mobile terminal 4.

Third Example Embodiment

Figure 13:
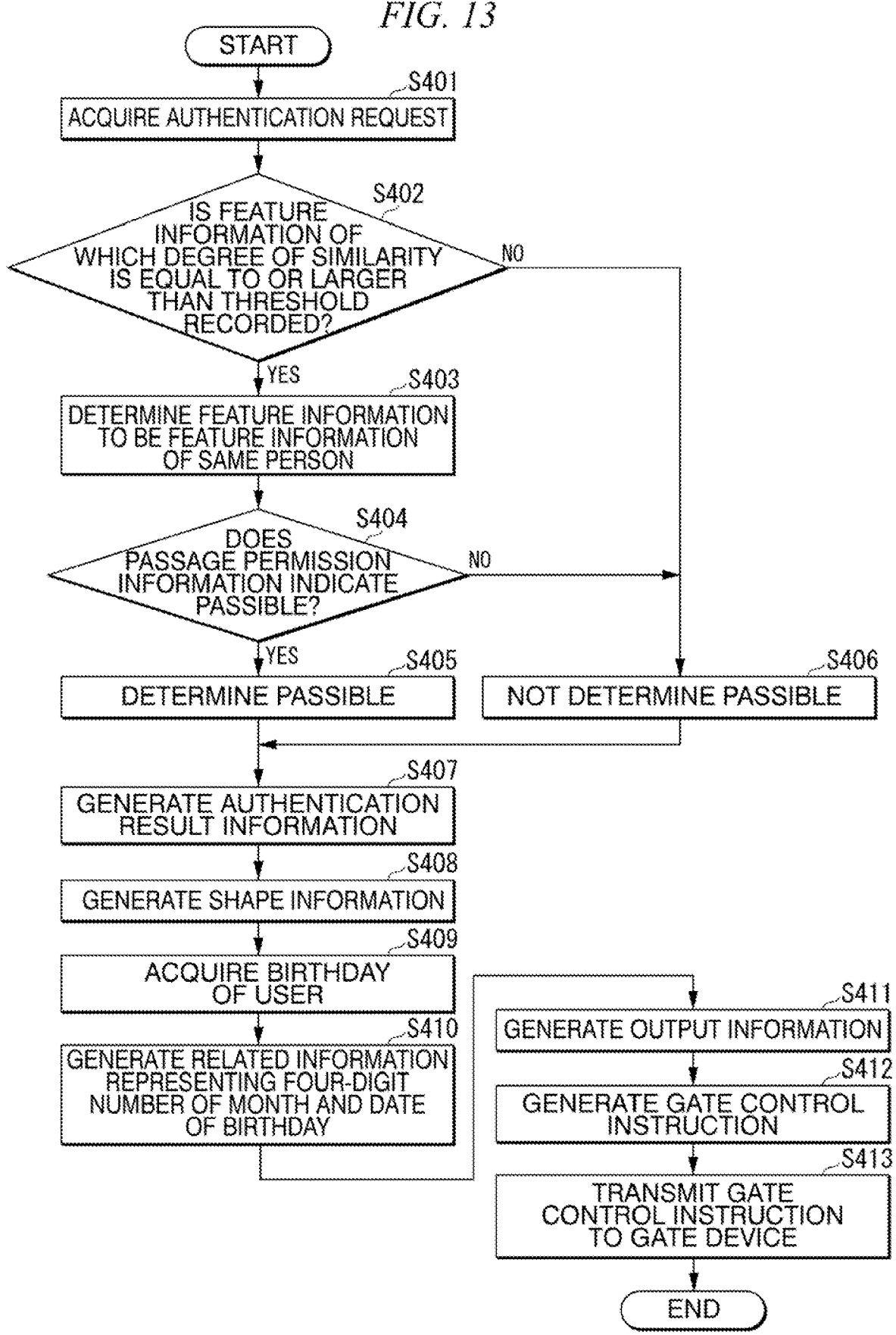
FIG. 13 is a diagram illustrating a processing flow of a gate device according to a third example embodiment of this disclosure.

FIG. 13 is a diagram illustrating a processing flow of a gate device according to a third example embodiment.

The gate device 10 may generate output information as below.

An acquisition unit 21 of an information processing device 20 acquires an authentication request (Step S401). The authentication unit 22 calculates a degree of similarity between the feature information of a face included in the authentication request and feature information of each of a plurality of faces recorded in a database 104 and determines whether feature information of which the degree of similarity is equal to or larger than a predetermined threshold is recorded in the database 104 (Step S402).

In a case in which feature information of a face of which the degree of similarity with the feature information included in the authentication request is equal to or larger than a predetermined threshold is registered in the database 204, the authentication unit 22 determines feature information having the highest degree of similarity as feature information of the same person as the user represented by the feature information included in the authentication request (Step S403).

The authentication unit 22 determines whether passage permission information associated with feature information of the same person as the user indicates passable (Step S404). For example, the authentication unit 22 determines whether information of an identifier of the gate device 10 included in the authentication request is associated with passage permission information associated with feature information of the same person as the user and is registered in the database 204. In a case in which the passage permission information associated with the feature information of the same person as the user and the information of the identifier of the gate device 10 included in the authentication request are registered in the database 204 in association with each other, the authentication unit 22 determines that the user is passable (Step S405).

On the other hand, in a case in which feature information of which the degree of similarity is equal to or higher than a predetermined threshold is not recorded in the database 204 or in a case in which the passage permission information associated with the feature information of the same person as the user and the information of the identifier of the gate device 10 included in the authentication request are not registered in the database 204 in association with each other, the authentication unit 22 determines that the user is not passable (Step S406). The authentication unit 22 generates authentication result information indicating passable or not passable (Step S407).

In addition, the authentication unit 22 acquires an ID of a user registered in the database 204 in association with the feature information of the same person as the user. When the authentication result information is generated, the authentication unit 22 outputs a process start instruction including the ID of the user to the generation unit 23.

The generation unit 23 acquires an ID of a user based on the process start instruction. It is assumed that the ID of the user is represented in a number string of 10 digits. The generation unit 23 acquires a number string of the last four digits of the 10-digit number string based on the ID of the user. The generation unit 23 generates shape information determined in correspondence with the ID of the user using the four-digit number string and an output information generation algorithm (Step S408). The generation of the shape information is similar to the process according to the first example embodiment described with reference to FIG. 9.

In addition, the generation unit 23 acquires a birthday of the user that is recorded in the database 204 in association with the ID of the user (Step S409). The generation unit 23 generates related information representing a four-digit number of month and date of the birthday (Step S410). The generation unit 23 generates output information including the shape information and the related information (Step S411).

The process of this generation unit 23 is one aspect of process of acquiring related information relating to a target associated with the identification information of the user who is a target and generating output information further including the related information.

The output unit 24 acquires the authentication result information generated by the authentication unit 22 and the shape information generated by the generation unit 23. The output unit 24 generates a gate control instruction that includes the authentication result information and the output information (Step S412). The output unit 24 acquires a network address of the gate device 10 that is included in the authentication request. The output unit 24 transmits the gate control instruction addressed to the acquired network address (Step S413).

Thereafter, in the gate devices 10, similar to the first example embodiment and the second example embodiment, a process of controlling the gate device 10 based on the authentication result information and outputting the output information is performed. In accordance with this, a user of the gate device 10 can check information that uniquely identifies the user based on the shape information and the information of the birthday together with an authentication result. Thus, the user can check that the authentication result is for the user, and other persons cannot immediately identify a relation between the output information and the user even when visually recognizing the output information.

Fourth Example Embodiment

Figure 14:
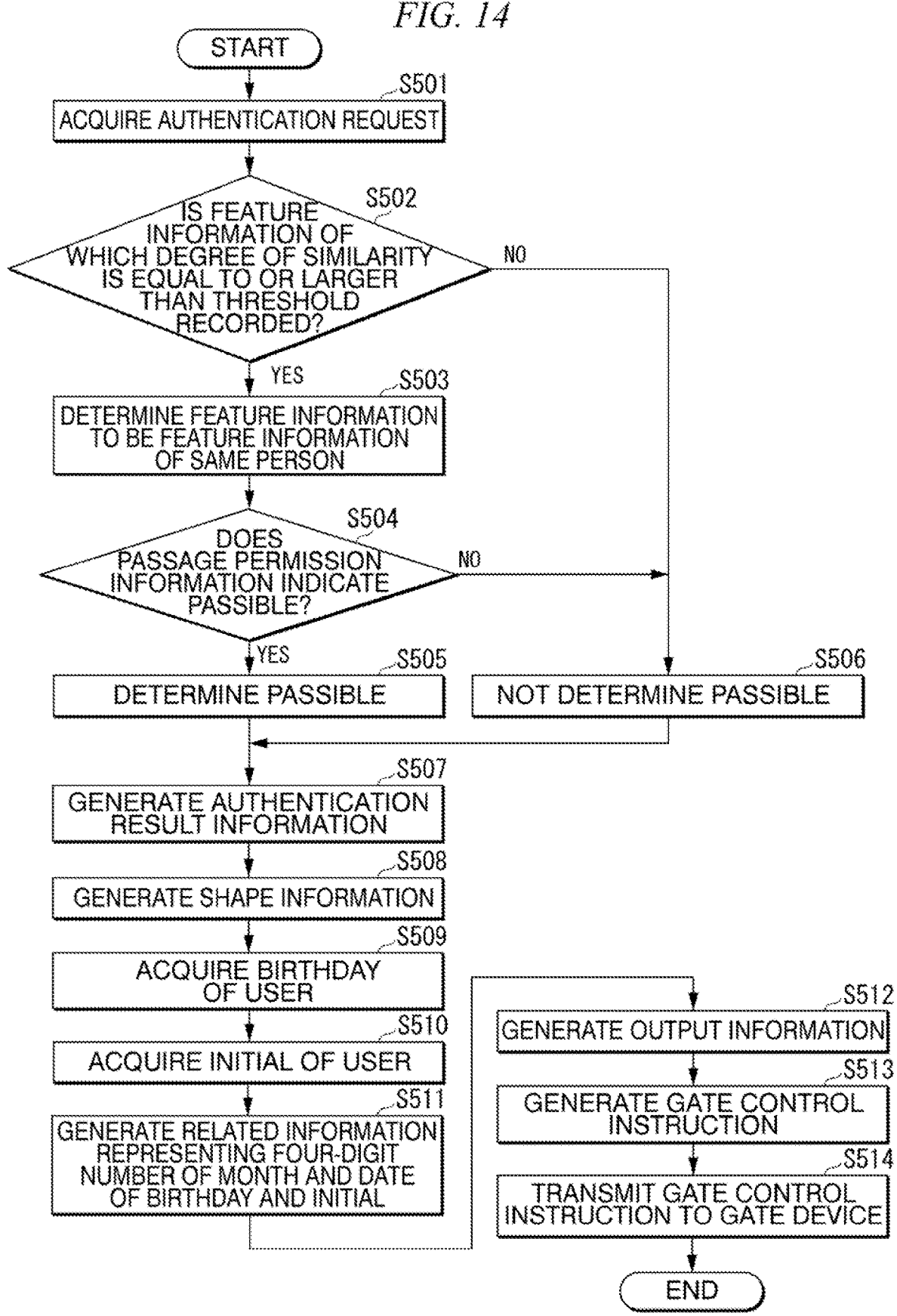
FIG. 14 is a diagram illustrating a processing flow of a gate device according to a fourth example embodiment of this disclosure.

FIG. 14 is a diagram illustrating a processing flow of a gate device according to a fourth example embodiment.

The gate device 10 may generate output information as below.

An acquisition unit 21 of an information processing device 20 acquires an authentication request (Step S501). The authentication unit 22 calculates a degree of similarity between the feature information of a face included in the authentication request and feature information of each of a plurality of faces recorded in a database 104 and determines whether feature information of which the degree of similarity is equal to or larger than a predetermined threshold is recorded in the database 104 (Step S502).

In a case in which feature information of a face of which the degree of similarity with the feature information included in the authentication request is equal to or larger than a predetermined threshold is registered in the database 204, the authentication unit 22 determines feature information having the highest degree of similarity as feature information of the same person as the user represented by the feature information included in the authentication request (Step S503).

The authentication unit 22 determines whether passage permission information associated with feature information of the same person as the user indicates passable (Step S504). For example, the authentication unit 22 determines whether information of an identifier of the gate device 10 included in the authentication request is associated with passage permission information associated with feature information of the same person as the user and is registered in the database 204. In a case in which the passage permission information associated with the feature information of the same person as the user and the information of the identifier of the gate device 10 included in the authentication request are registered in the database 204 in association with each other, the authentication unit 22 determines that the user is passable (Step S505).

On the other hand, in a case in which feature information of which the degree of similarity is equal to or higher than a predetermined threshold is not recorded in the database 204 or in a case in which the passage permission information associated with the feature information of the same person as the user and the information of the identifier of the gate device 10 included in the authentication request are not registered in the database 204 in association with each other, the authentication unit 22 determines that the user is not passable (Step S506). The authentication unit 22 generates authentication result information indicating passible or not passable (Step S507).

In addition, the authentication unit 22 acquires an ID of a user registered in the database 204 in association with the feature information of the same person as the user. When the authentication result information is generated, the authentication unit 22 outputs a process start instruction including the ID of the user to the generation unit 23.

The generation unit 23 acquires an ID of a user based on the process start instruction. It is assumed that the ID of the user is represented in a number string of 10 digits. The generation unit 23 acquires a number string of the last four digits of the 10-digit number string based on the ID of the user. The generation unit 23 generates shape information determined in correspondence with the ID of the user using the four-digit number string and an output information generation algorithm (Step S508). The generation of the shape information is similar to the process according to the first example embodiment described with reference to FIG. 9.

In addition, the generation unit 23 acquires a birthday of the user that is recorded in the database 204 in association with the ID of the user (Step S509). Furthermore, the generation unit 23 acquires initials of the name of a user, which is written in English, recorded in the database 204 in association with an ID of the user (Step S510). The generation unit 23 generates related information including a four-digit number of month and date of the birthday and the initials (Step S511). The generation unit 23 generates output information including the shape information and the related information (Step S512).

The process of this generation unit 23 is one aspect of process of acquiring related information relating to a target associated with the identification information of the user who is a target and generating output information further including the related information.

The output unit 24 acquires the authentication result information generated by the authentication unit 22 and the output information generated by the generation unit 23. The output unit 24 generates a gate control instruction that includes the authentication result information and the output information (Step S513). The output unit 24 acquires a network address of the gate device 10 that is included in the authentication request. The output unit 24 transmits the gate control instruction addressed to the acquired network address (Step S514).

Thereafter, in the gate devices 10, similar to the first example embodiment and the second example embodiment, a process of controlling the gate device 10 based on the authentication result information and outputting the output information is performed. In accordance with this, a user of the gate device 10 can check information that uniquely identifies the user based on the shape information, the information of the birthday, and the initials together with an authentication result. Thus, the user can check that the authentication result is for the user, and other persons cannot immediately identify a relation between the output information and the user even when visually recognizing the output information.

Fifth Example Embodiment

Figure 15:
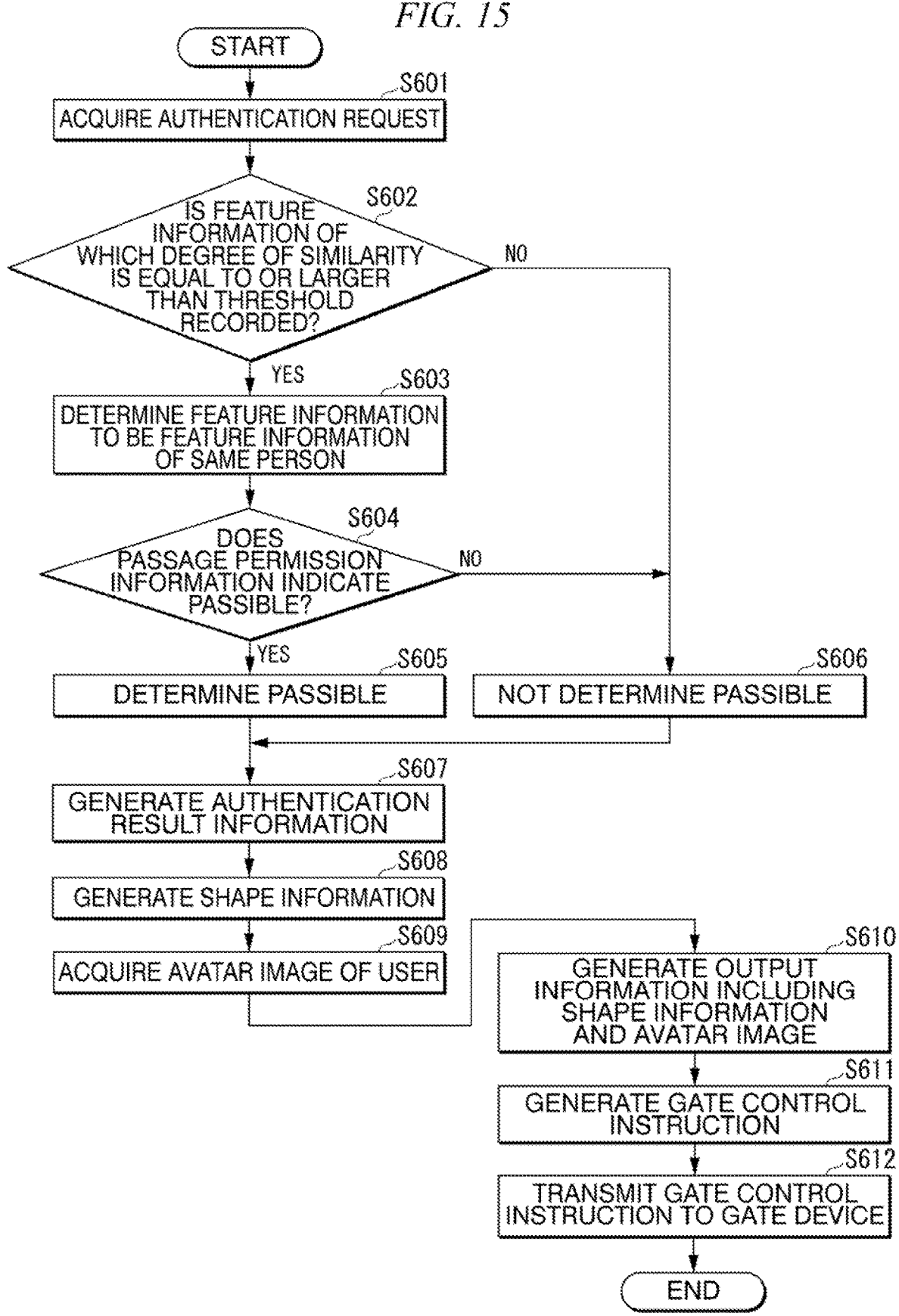
FIG. 15 is a diagram illustrating a processing flow of a gate device according to a fifth example embodiment of this disclosure.

FIG. 15 is a diagram illustrating a processing flow of a gate device according to a fifth example embodiment.

The gate device 10 may generate output information as below.

An acquisition unit 21 of an information processing device 20 acquires an authentication request (Step S601). The authentication unit 22 calculates a degree of similarity between the feature information of a face included in the authentication request and feature information of each of a plurality of faces recorded in a database 104 and determines whether feature information of which the degree of similarity is equal to or larger than a predetermined threshold is recorded in the database 104 (Step S602).

In a case in which feature information of a face of which the degree of similarity with the feature information included in the authentication request is equal to or larger than a predetermined threshold is registered in the database 204, the authentication unit 22 determines feature information having the highest degree of similarity as feature information of the same person as the user represented by the feature information included in the authentication request (Step S603).

The authentication unit 22 determines whether passage permission information associated with feature information of the same person as the user indicates passable (Step S604). For example, the authentication unit 22 determines whether information of an identifier of the gate device 10 included in the authentication request is associated with passage permission information associated with feature information of the same person as the user and is registered in the database 204. In a case in which the passage permission information associated with the feature information of the same person as the user and the information of the identifier of the gate device 10 included in the authentication request are registered in the database 204 in association with each other, the authentication unit 22 determines that the user is passable (Step S605).

On the other hand, in a case in which feature information of which the degree of similarity is equal to or higher than a predetermined threshold is not recorded in the database 204 or in a case in which the passage permission information associated with the feature information of the same person as the user and the information of the identifier of the gate device 10 included in the authentication request are not registered in the database 204 in association with each other, the authentication unit 22 determines that the user is not passable (Step S606). The authentication unit 22 generates authentication result information indicating passible or not passable (Step S607).

In addition, the authentication unit 22 acquires an ID of a user registered in the database 204 in association with the feature information of the same person as the user. When the authentication result information is generated, the authentication unit 22 outputs a process start instruction including the ID of the user to the generation unit 23.

The generation unit 23 acquires an ID of a user based on the process start instruction. It is assumed that the ID of the user is represented in a number string of 10 digits. The generation unit 23 acquires a number string of the last four digits of the 10-digit number string based on the ID of the user. The generation unit 23 generates shape information determined in correspondence with the ID of the user using the four-digit number string and an output information generation algorithm (Step S608). The generation of the shape information is similar to the process according to the first example embodiment described with reference to FIG. 9.

In addition, the generation unit 23 acquires an avatar image of the user that is recorded in the database 204 in association with the ID of the user (Step S609). The avatar image is a character image of the user, and the avatar image may be an image of an animal or may be an image imitating a person. The avatar image is one aspect of related information relating to a target associated with identification information of a user who is a target. The generation unit 23 generates output information including the shape information and the avatar image (related information) (Step S610).

The output unit 24 acquires the authentication result information generated by the authentication unit 22 and the output information generated by the generation unit 23. The output unit 24 generates a gate control instruction that includes the authentication result information and the output information (Step S611). The output unit 24 acquires a network address of the gate device 10 that is included in the authentication request. The output unit 24 transmits the gate control instruction addressed to the acquired network address (Step S612).

Thereafter, in the gate devices 10, similar to the first example embodiment and the second example embodiment, a process of controlling the gate device 10 based on the authentication result information and outputting the output information is performed. In accordance with this, a user of the gate device 10 can check information that uniquely identifies the user based on the shape information and information of the avatar image together with an authentication result. Thus, the user can check that the authentication result is for the user, and other persons cannot immediately identify a relation between the output information and the user even when visually recognizing the output information.

Sixth Example Embodiment

Figure 16:
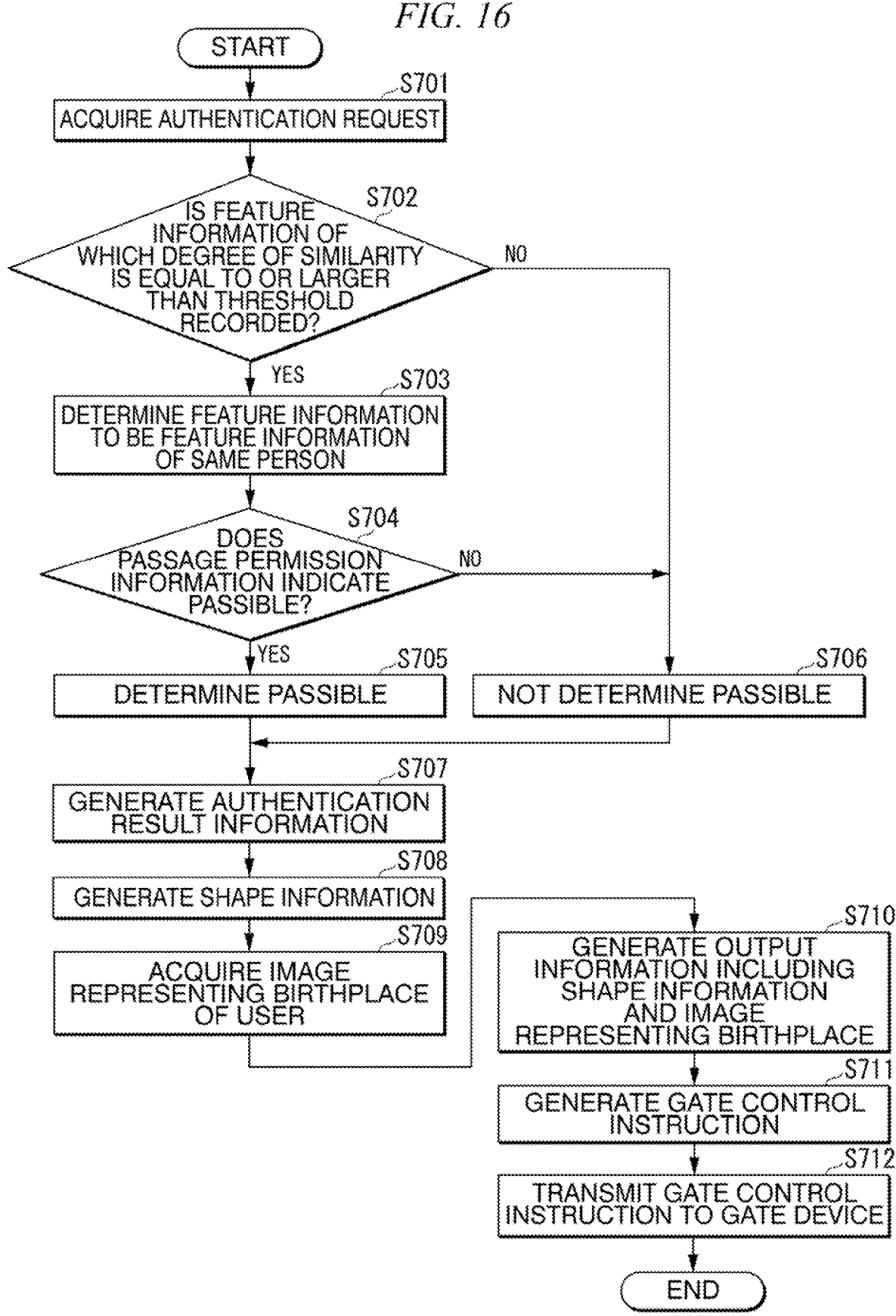
FIG. 16 is a diagram illustrating a processing flow of a gate device according to a sixth example embodiment of this disclosure.

FIG. 16 is a diagram illustrating a processing flow of a gate device according to a sixth example embodiment.

The gate device 10 may generate output information as below.

An acquisition unit 21 of an information processing device 20 acquires an authentication request (Step S701). The authentication unit 22 calculates the degree of similarity between the feature information of a face included in the authentication request and feature information of each of a plurality of faces recorded in a database 104 and determines whether feature information of which the degree of similarity is equal to or larger than a predetermined threshold is recorded in the database 104 (Step S702).

In a case in which feature information of a face of which the degree of similarity with the feature information included in the authentication request is equal to or larger than a predetermined threshold is registered in the database 204, the authentication unit 22 determines feature information having the highest degree of similarity as feature information of the same person as the user represented by the feature information included in the authentication request (Step S703).

The authentication unit 22 determines whether passage permission information associated with feature information of the same person as the user indicates passable (Step S704). For example, the authentication unit 22 determines whether information of an identifier of the gate device 10 included in the authentication request is associated with passage permission information associated with feature information of the same person as the user and is registered in the database 204. In a case in which the passage permission information associated with the feature information of the same person as the user and the information of the identifier of the gate device 10 included in the authentication request are registered in the database 204 in association with each other, the authentication unit 22 determines that the user is passable (Step S705).

On the other hand, in a case in which feature information of which the degree of similarity is equal to or higher than a predetermined threshold is not recorded in the database 204 or in a case in which the passage permission information associated with the feature information of the same person as the user and the information of the identifier of the gate device 10 included in the authentication request are not registered in the database 204 in association with each other, the authentication unit 22 determines that the user is not passable (Step S706). The authentication unit 22 generates authentication result information indicating passible or not passable (Step S707).

In addition, the authentication unit 22 acquires an ID of a user registered in the database 204 in association with the feature information of the same person as the user. When the authentication result information is generated, the authentication unit 22 outputs a process start instruction including the ID of the user to the generation unit 23.

The generation unit 23 acquires an ID of a user based on the process start instruction. The ID of the user is represented in a number string of 10 digits. The generation unit 23 acquires a number string of the last four digits of the 10-digit number string based on the ID of the user. The generation unit 23 generates shape information determined in correspondence with the ID of the user using the four-digit number string and an output information generation algorithm (Step S708). The generation of the shape information is similar to the process according to the first example embodiment described with reference to FIG. 9.

In addition, the generation unit 23 acquires an image representing a birthplace of the user that is recorded in the database 204 in association with the ID of the user (Step S709). The image representing a birthplace is one aspect of related information relating to a target associated with identification information of a user who is a target. The generation unit 23 generates output information including the shape information and the image representing a birthplace (related information) (Step S710).

The output unit 24 acquires the authentication result information generated by the authentication unit 22 and the output information generated by the generation unit 23. The output unit 24 generates a gate control instruction that includes the authentication result information and the output information (Step S711). The output unit 24 acquires a network address of the gate device 10 that is included in the authentication request. The output unit 24 transmits the gate control instruction addressed to the acquired network address (Step S712).

Thereafter, in the gate devices 10, similar to the first example embodiment and the second example embodiment, a process of controlling the gate device 10 based on the authentication result information and outputting the output information is performed. In accordance with this, a user of the gate device 10 can check information that uniquely identifies the user based on the shape information and information of the image representing his or her birthplace together with an authentication result. Thus, the user can check that the authentication result is for the user, and other persons cannot immediately identify a relation between the output information and the user even when visually recognizing the output information.

Seventh Example Embodiment

Figure 17:
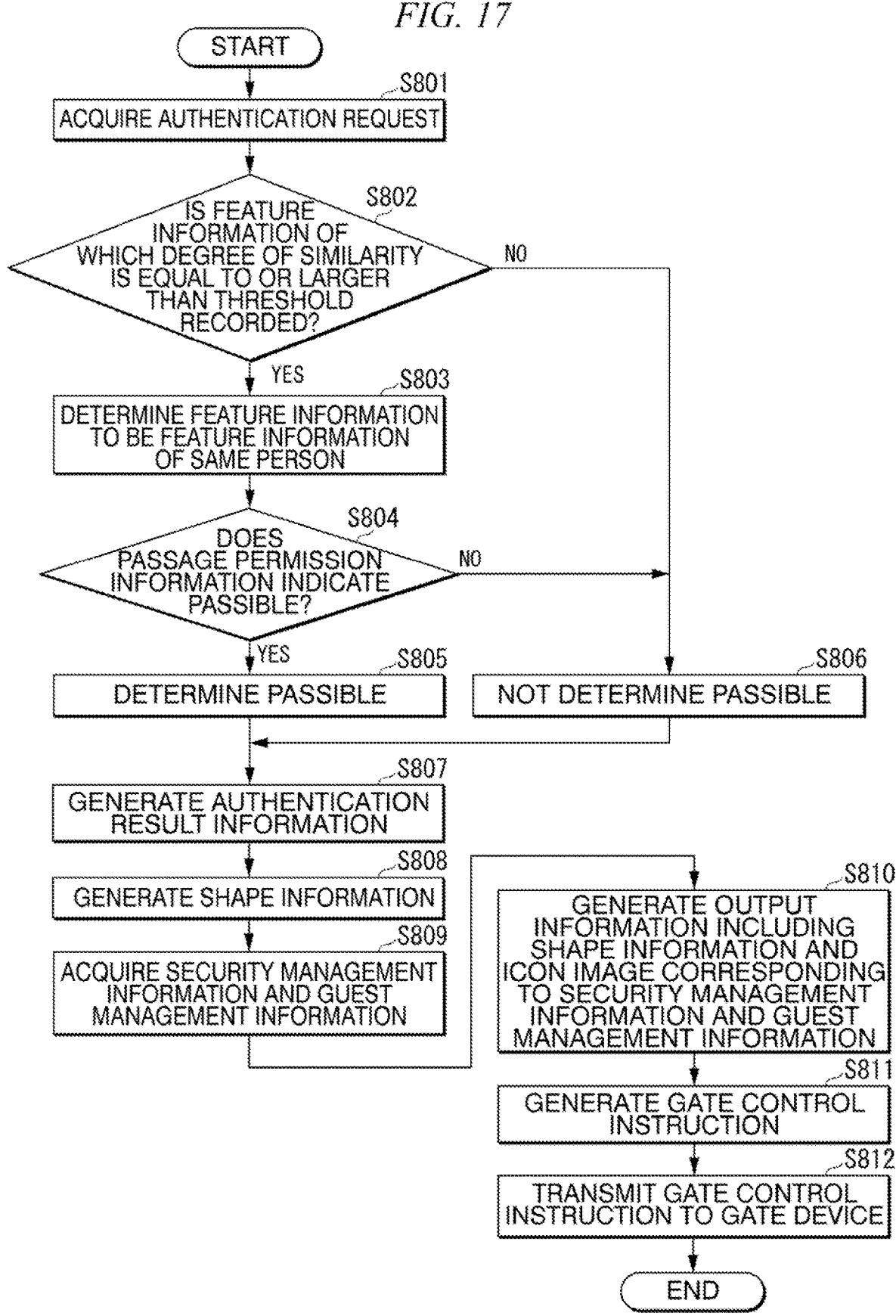
FIG. 17 is a diagram illustrating a processing flow of a gate device according to a seventh example embodiment of this disclosure.

FIG. 17 is a diagram illustrating a processing flow of a gate device according to a seventh example embodiment.

The gate device 10 may generate output information as below.

An acquisition unit 21 of an information processing device 20 acquires an authentication request (Step S801). The authentication unit 22 calculates the degree of similarity between the feature information of a face included in the authentication request and feature information of each of a plurality of faces recorded in a database 104 and determines whether feature information of which the degree of similarity is equal to or larger than a predetermined threshold is recorded in the database 104 (Step S802).

In a case in which feature information of a face of which the degree of similarity with the feature information included in the authentication request is equal to or larger than a predetermined threshold is registered in the database 204, the authentication unit 22 determines feature information having the highest degree of similarity as feature information of the same person as the user represented by the feature information included in the authentication request (Step S803).

The authentication unit 22 determines whether passage permission information associated with feature information of the same person as the user indicates passable (Step S804). For example, the authentication unit 22 determines whether information of an identifier of the gate device 10 included in the authentication request is associated with passage permission information associated with feature information of the same person as the user and is registered in the database 204. In a case in which the passage permission information associated with the feature information of the same person as the user and the information of the identifier of the gate device 10 included in the authentication request are registered in the database 204 in association with each other, the authentication unit 22 determines that the user is passable (Step S805).

On the other hand, in a case in which feature information of which the degree of similarity is equal to or higher than a predetermined threshold is not recorded in the database 204 or in a case in which the passage permission information associated with the feature information of the same person as the user and the information of the identifier of the gate device 10 included in the authentication request are not registered in the database 204 in association with each other, the authentication unit 22 determines that the user is not passable (Step S806). The authentication unit 22 generates authentication result information indicating passible or not passable (Step S807).

In addition, the authentication unit 22 acquires an ID of a user registered in the database 204 in association with the feature information of the same person as the user. When the authentication result information is generated, the authentication unit 22 outputs a process start instruction including the ID of the user to the generation unit 23.

The generation unit 23 acquires an ID of a user based on the process start instruction. It is assumed that the ID of the user is represented in a number string of 10 digits. The generation unit 23 acquires a number string of the last four digits of the 10-digit number string based on the ID of the user. The generation unit 23 generates shape information determined in correspondence with the ID of the user using the four-digit number string and an output information generation algorithm (Step S808). The generation of the shape information is similar to the process according to the first example embodiment described with reference to FIG. 9.

In addition, the generation unit 23 acquires feature information of the user from the authentication unit 22. The generation unit 23 acquires security management information and guest management information of the user from the database 204 based on the feature information (Step S809). The security management information may be a degree of security of the user represented by feature information of the face or the like. For example, this degree of security may be information that is determined in accordance with a past crime history or the like. In addition, the guest management information may be information that represents whether or not a user is a guest. The generation unit 23 generates output information including shape information and an icon image corresponding to the security management information and the guest management information (related information) (Step S810). For example, when the security management information is information representing degrees of security in two levels of safety and danger, the icon image corresponding to the security management information is an icon image representing safety or danger. In addition, the icon image corresponding to the guest management information may be an icon image representing whether the corresponding person is a guest or not.

The output unit 24 acquires the authentication result information generated by the authentication unit 22 and the output information generated by the generation unit 23. The output unit 24 generates a gate control instruction that includes the authentication result information and the output information (Step S811). The output unit 24 acquires a network address of the gate device 10 that is included in the authentication request. The output unit 24 transmits the gate control instruction addressed to the acquired network address (Step S812).

Thereafter, in the gate devices 10, similar to the first example embodiment and the second example embodiment, a process of controlling the gate device 10 based on the authentication result information and outputting the output information is performed. At this time, the gate device 10 may display output information including authentication result information and icon images corresponding to the security management information and the guest management information on a nearby monitor or the like that is communicatively connected. In accordance with this, a guard or the like who has checked the monitor can determine whether a user is a guest or a person having a crime history. In a case in which it is detected that a target having a past crime history has been found based on the security management information, the gate device 10 may not only output it to the monitor but also generate alarm information for a guard and output the alarm information to a predetermined output destination and may perform the process of closing flappers 14.

Eighth Example Embodiment

Figure 18:
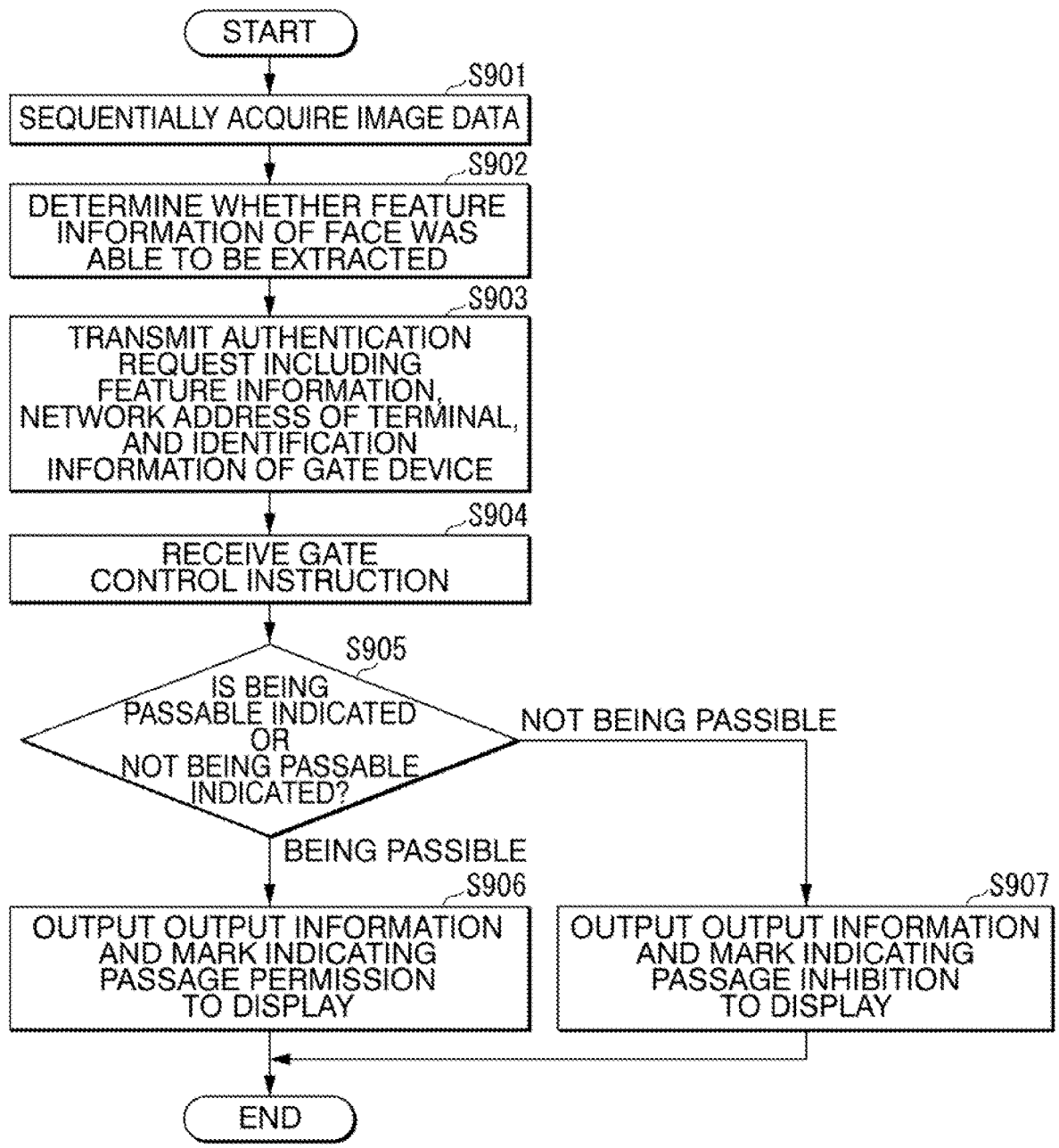
FIG. 18 is a diagram illustrating a processing flow of a management mobile terminal according to an eighth example embodiment of this disclosure.

FIG. 18 is a diagram illustrating a processing flow of a management mobile terminal according to an eighth example embodiment.

Figure 19:
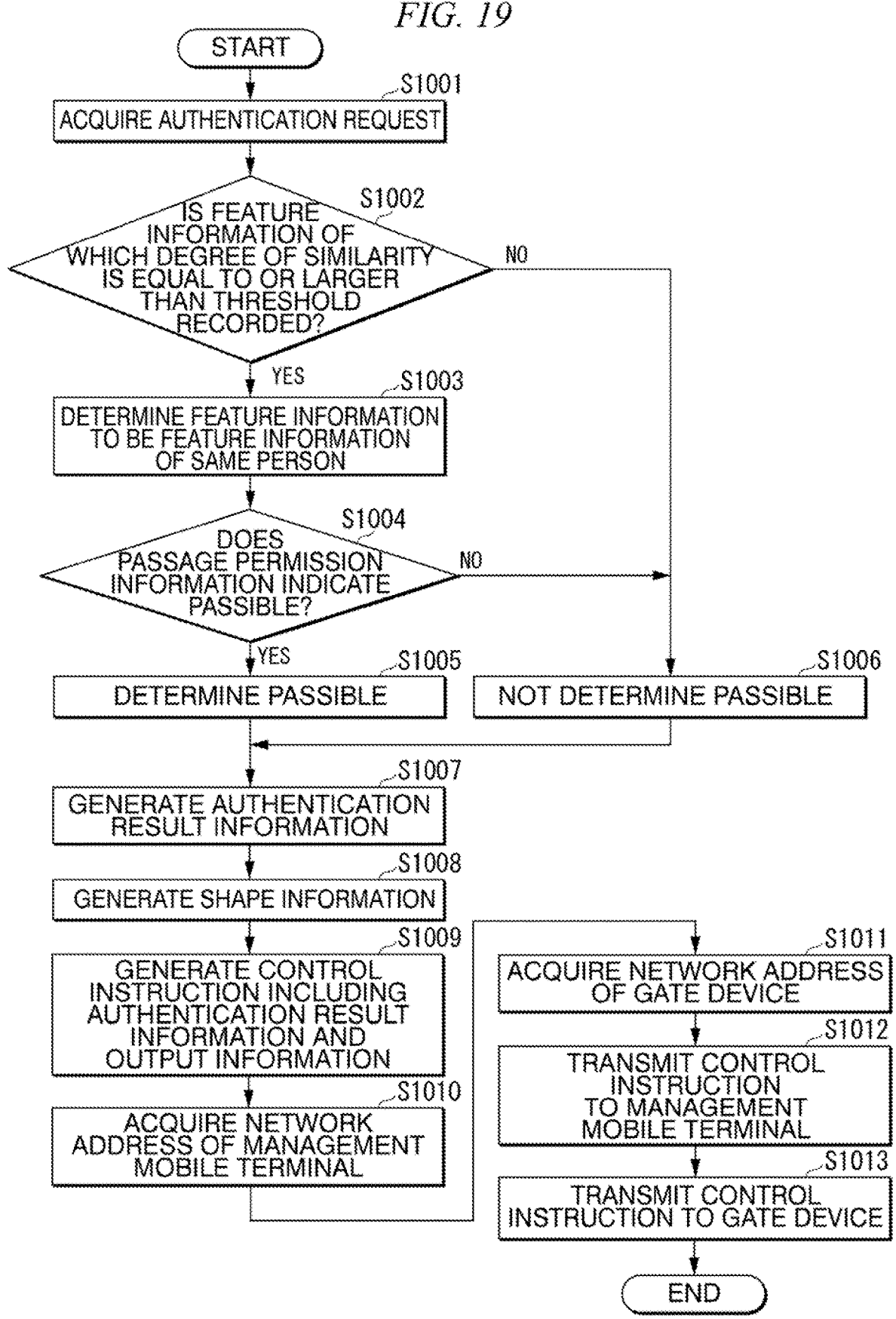
FIG. 19 is a diagram illustrating a processing flow of an information processing device according to the eighth example embodiment of this disclosure.

FIG. 19 is a diagram illustrating a processing flow of an information processing device according to the eighth example embodiment.

Figure 20:
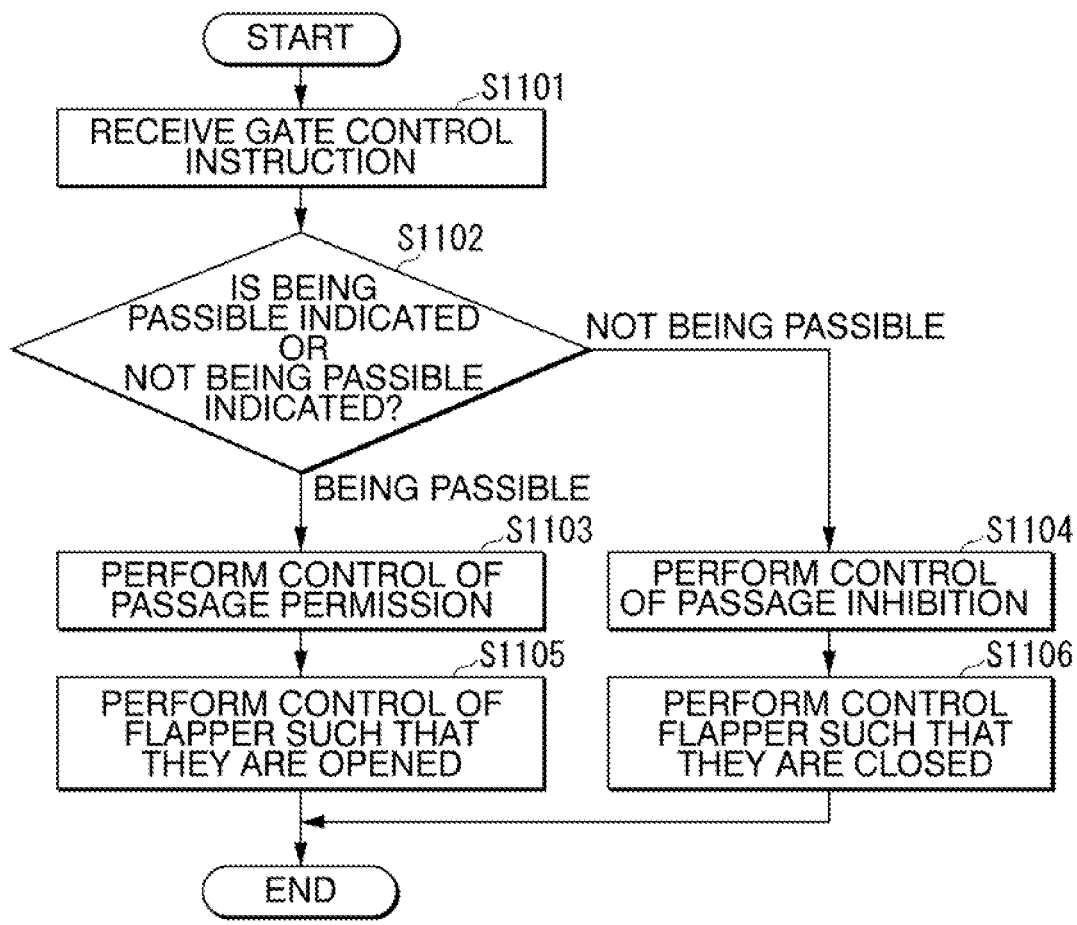
FIG. 20 is a diagram illustrating a processing flow of a gate device according to the eighth example embodiment of this disclosure.

FIG. 20 is a diagram illustrating a processing flow of a gate device according to the eighth example embodiment.

In the first to seventh example embodiments described above, an example in which the gate device 10 acquires a face image of a user has been described. However, a device other than the gate device 10 may acquire an image of a face of a user to pass through the gate device 10. For example, a management mobile terminal 44 carried by a guard present near the gate device may capture an image of a face of a user using a camera included in the terminal. Hereinafter, an example of such a case will be described. The management mobile terminal 44 is connected to the information processing device 20 to be able to communicate with each other.

A user approaches the gate main body 1. A guard is assumed to activate a dedicated application recorded in the management mobile terminal 44 near the gate device 10. In accordance with this, the management mobile terminal 44 may be connected to the gate device 10 to be able to communicate with each other. This communicative connection may have an aspect in which the management mobile terminal 44 and the gate device 10 are constantly connected while the dedicated application is activating in the management mobile terminal 44. When being communicatively connected to the gate device 10, the management mobile terminal 44 acquires identification information of the gate device 10. In addition, the management mobile terminal 44 is assumed to be also communicatively connected to the information processing device 20 via a communication network.

A guard captures an image of a face of a user approaching the gate device 10 to pass through the gate device 10 using the management mobile terminal 44 carried by the guard. The management mobile terminal 44 sequentially acquires image data including images captured by a camera included in the management mobile terminal (Step S901). When the image data is acquired, the management mobile terminal 44 starts to extract feature of a face shown in an image represented by the image data.

The management mobile terminal 44 determines whether feature information of a face of a person was able to be extracted from an image included in the image data (Step S902). In a case in which the feature information of the face was able to be extracted, the management mobile terminal 44 transmits an authentication request including the feature information, the network address of the management mobile terminal, and the identification information of the gate device 10 to the information processing device 20 (Step S903).

The information processing device 20 stores feature information of a face, passage permission information, and the like registered in advance by a user of the gate device 10 in the database 204 or the like in association with each other. The passage permission information may be an information group or the like of identification information of the gate device 10 through which a user can pass.

The acquisition unit 21 of the information processing device 20 acquires an authentication request (Step S1001). The authentication unit 22 calculates a degree of similarity between the feature information of a face included in the authentication request and feature information of each of a plurality of faces recorded in the database 104 and determines whether feature information of which the degree of similarity is equal to or larger than a predetermined threshold is recorded in the database 104 (Step S1002).

In a case in which feature information of a face of which the degree of similarity with the feature information included in the authentication request is equal to or larger than a predetermined threshold is registered in the database 204, the authentication unit 22 determines feature information having the highest degree of similarity as feature information of the same person as the user represented by the feature information included in the authentication request (Step S1003).

The authentication unit 22 determines whether passage permission information associated with feature information of the same person as the user indicates passable (Step S1004). For example, the authentication unit 22 determines whether information of an identifier of the gate device 10 included in the authentication request is associated with passage permission information associated with feature information of the same person as the user and is registered in the database 204. In a case in which the passage permission information associated with the feature information of the same person as the user and the information of the identifier of the gate device 10 included in the authentication request are registered in the database 204 in association with each other, the authentication unit 22 determines that the user is passable (Step S1005).

On the other hand, in a case in which feature information of which the degree of similarity is equal to or higher than a predetermined threshold is not recorded in the database 204 or in a case in which the passage permission information associated with the feature information of the same person as the user and the information of the identifier of the gate device 10 included in the authentication request are not registered in the database 204 in association with each other, the authentication unit 22 determines that the user is not passable (Step S1006). The authentication unit 22 generates authentication result information indicating passible or not passable (Step S1007).

In addition, the authentication unit 22 acquires an ID of a user registered in the database 204 in association with the feature information of the same person as the user. When the authentication result information is generated, the authentication unit 22 outputs a process start instruction including the ID of the user to the generation unit 23.

The generation unit 23 acquires an ID of a user based on the process start instruction. It is assumed that the ID of the user is represented in a number string of 10 digits. The generation unit 23 acquires a number string of the last four digits of the 10-digit number string based on the ID of the user. The generation unit 23 generates output information determined in correspondence with the ID of the user using the four-digit number string and an output information generation algorithm (Step S1008). The output information is information that represents a shape.

The output unit 24 acquires the authentication result information generated by the authentication unit 22 and the output information generated by the generation unit 23. The output unit 24 generates a control instruction that includes the authentication result information and the output information (Step S1009). The output unit 24 acquires a network address of the management mobile terminal 44 that is included in the authentication request (Step S1010). The output unit 24 acquires identification information of the gate device 10 that is included in the authentication request. The output unit 24 acquires a network address of the gate device 10 that is recorded in the database 204 in association with the identification information of the gate device 10 (Step S1011). The output unit 24 transmits a control instruction addressed to the acquired network address of the management mobile terminal 44 (Step S1012). Furthermore, the output unit 24 transmits a control instruction addressed to the acquired network address of the gate device 10 (Step S1013).

The management mobile terminal 44 carried by the guard receives the control instruction (Step S904). The management mobile terminal 44 acquires an authentication result from the control instruction. The management mobile terminal 44 determines whether information included in the authentication result information indicates passable or not passable (Step S905). In a case in which information indicating passible is included in the authentication result information, the management mobile terminal 44 outputs the output information and a mark indicating passage permission to the display 13 (Step S906).

In accordance with this, the guard can recognize that the authentication result of the user to pass through the gate device 10 is passage permission. In addition, the guard causes information displayed on the display 13 to be visually recognized by the user. In accordance with this, the user recognizes that passage is permitted based on the mark indicating passage permission and recognizes that the passage permission is for him or her by recognizing that the passage permission is output information determined in accordance with an ID of the user by visually recognizing the output information. Then, the user passes through the gate device 10.

On the other hand, in a case in which information indicating passage inhibition is included in the authentication result information, the management mobile terminal 44 outputs the output information and the mark indicating passage inhibition to the display 13 (Step S907). In accordance with this, the guard can recognize that the authentication result of the user to pass through the gate device 10 is passage inhibition. In addition, the guard causes the information displayed on the display 13 to be visually recognized by the user. In accordance with this, the user recognizes that passage is inhibited based on the mark indicating passage inhibition and recognizes that the passage inhibition is for him or her by recognizing that the passage inhibition is output information determined in accordance with an ID of the user by visually recognizing the output information. The user may talk with the guard for passing through the gate device 10 or the like without passing through the gate device 10.

A gate control device 15 of the gate device 10 receives a gate control instruction (Step S1101). The gate control unit 151 of the gate control device 15 acquires authentication result information included in the gate control instruction. An output information control unit 152 of the gate control device 15 acquires output information included in the gate control instruction. The gate control unit 151 determines whether information included in the authentication result information indicates passable or not passable (Step S1102). In a case in which information indicating passable is included in the authentication result information, the gate control unit 151 performs control of passage permission (Step S1103). In a case in which information indicating not passable is included in the authentication result information, the gate control unit 151 performs control of passage inhibition (Step S1104).

When the control of passage permission is determined to be performed, the gate control unit 151 outputs information indicating passage permission to the output information control unit 152. In addition, the gate control unit 151 performs control of flappers 14 of the gate device 10 such that they are opened (Step S1105). In accordance with this, a passage area of the gate device 10 is opened.

When the control of passage inhibition is determined to be performed, the gate control unit 151 outputs information indicating passage inhibition to the output information control unit 152. In addition, the gate control unit 151 performs control of the flappers 14 of the gate device 10 such that they are closed (Step S1106). In accordance with this, the passage area of the gate device 10 is closed.

According to the process of the eighth example embodiment described above, a person managing the gate device 10 such as a guard captures an image of a user to pass through the gate device 10 using the management mobile terminal 44 and, as a result, can display the authentication result of the user and the shape information determined in accordance with the identification information of the user on the management mobile terminal 44.

In the eighth example embodiment described above, the information processing device 20 separately transmits a control instruction to the management mobile terminal 44 and the gate device 10. However, the information processing device 20 may transmit a control instruction to one of the management mobile terminal 44 and the gate device 10, and the management mobile terminal 44 or the gate device 10 that has received the control instruction may transmit the control instruction to the other thereof.

Ninth Example Embodiment

In the processes of the first example embodiment to the eighth example embodiment described above, both the shape information determined in correspondence with the identification information of the user who is an authentication target included in the output information and the information representing an authentication result have been described to be displayed. However, a captured image of the user who is an authentication target may be further displayed, and the shape information and the authentication result may be displayed in the captured image. A case in which the corresponding process is performed by the gate device 10 will be described.

When output information and an authentication result (a mark indicating passage permission or passage inhibition) are displayed on the display 13, the gate device 10 sequentially acquires captured images acquired from the camera 11. By sequentially displaying the captured images that have been acquired, the gate device 10 can output the captured images as a moving image. It is assumed that a user is shown in the captured image. The gate device 10 displays the output information and the authentication result on the captured image in a superimposing manner. In accordance with this, a user can simultaneously check his or her face image, the output information, and the authentication result.

In addition, it is assumed that a user and a plurality of persons other than the user are shown in a captured image captured by the camera 11 of the gate device 10. In this case, the gate device 10 may identify a face that has generated feature information of the face as a user of the gate device 10 among a plurality of persons shown in the captured image and display only a face image thereof. In accordance with this, even in a case in which a plurality of persons are shown in a captured image, the output information and the authentication result can be displayed in the display 13 with being superimposed on the face image of the user that has been authenticated.

In each of the example embodiments described above, although the output information, the authentication result, and the captured image are displayed on the display 13 included in the gate device 10, the gate device 10 may display such information on a monitor that is communicatively connected to a gate device 10 and is provided near the gate device 10.

Tenth Example Embodiment

In a case in which a plurality of persons are shown in a captured image that is captured by the camera 11 included in the gate device 10, the gate device 10 and the information processing device 20 may perform similar processes for the plurality of persons.

In such a case, the gate control unit 151 of the gate device 10 generates feature information for each person shown in the captured image and generates each piece of authentication information including each piece of feature information similar to each of the example embodiments described above. The gate control unit 151 transmits the plurality of pieces of authentication information that have been generated to the information processing device 20. Then, the information processing device 20 performs a process similar to each of the example embodiments described above based on each piece of authentication information, generates a gate control instruction, and transmits the gate control instruction to the gate device 10.

The gate device 10 sequentially receives gate control instructions corresponding to respective authentication requests. The gate control unit 151 identifies a correspondence relation between a gate control instruction and feature information of each face in the captured image. For example, a process ID is included in an authentication request, and the information processing device 20 stores the same process ID in gate control instructions corresponding to the authentication request. By temporarily storing the feature information and the process ID in association with each other, the gate control unit 151 can identify feature information stored in association with a process ID using the process ID included in the gate control instruction information.

When the gate control unit 151 identifies a correspondence relation between a process ID corresponding to feature information of a face shown in a captured image and a gate control instruction, the output information control unit 152 displays output information included in the gate control instruction and a mark indicated by the authentication result with being superimposed on a face in the captured image captured by the camera 11 in the monitor or the like. For example, in a case in which the process according to the present example embodiment is applied to the seventh example embodiment described above, the gate device 10 can output the output information of a person who is a target having a crime history in association with a face image of the person who is the target. In addition, the gate control unit 151 may perform a process of recording the output information of a person having a crime history and feature information of a face of the person who is a target in the information processing device 20 in association with each other.

In accordance with the process described above, in a case in which a capture image in which a plurality of persons are shown is displayed in a monitor, output information and a mark indicating an authentication result can be displayed for each of the plurality of persons. In accordance with this, a manager or the like can manage a user to pass through the gate device 10 while checking the monitor.

Eleventh Example Embodiment

Figure 21:
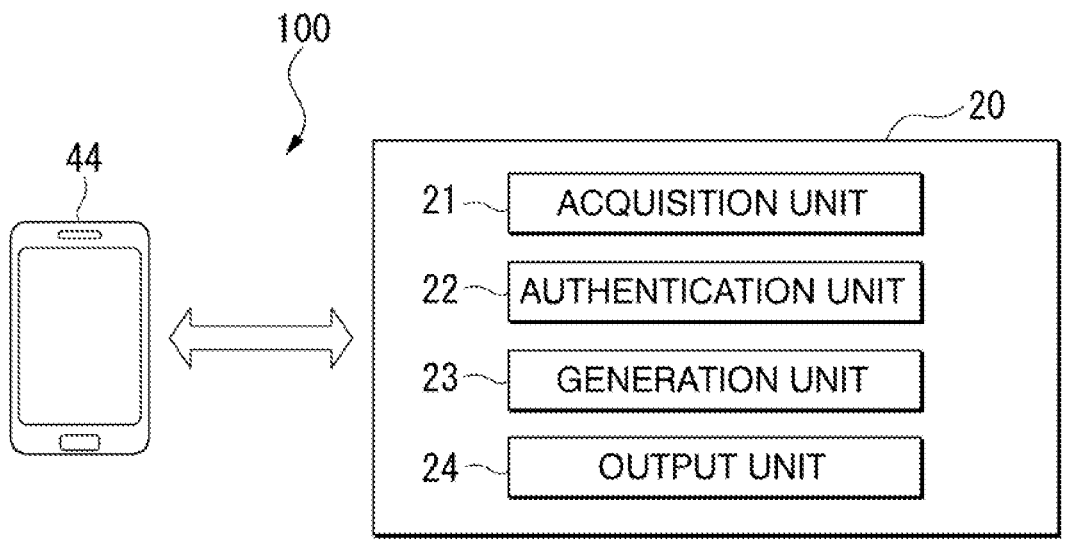
FIG. 21 is a diagram illustrating an overview of an information processing system according to an eleventh example embodiment.

FIG. 21 is a diagram illustrating an overview of an information processing system according to an eleventh example embodiment.

Figure 22:
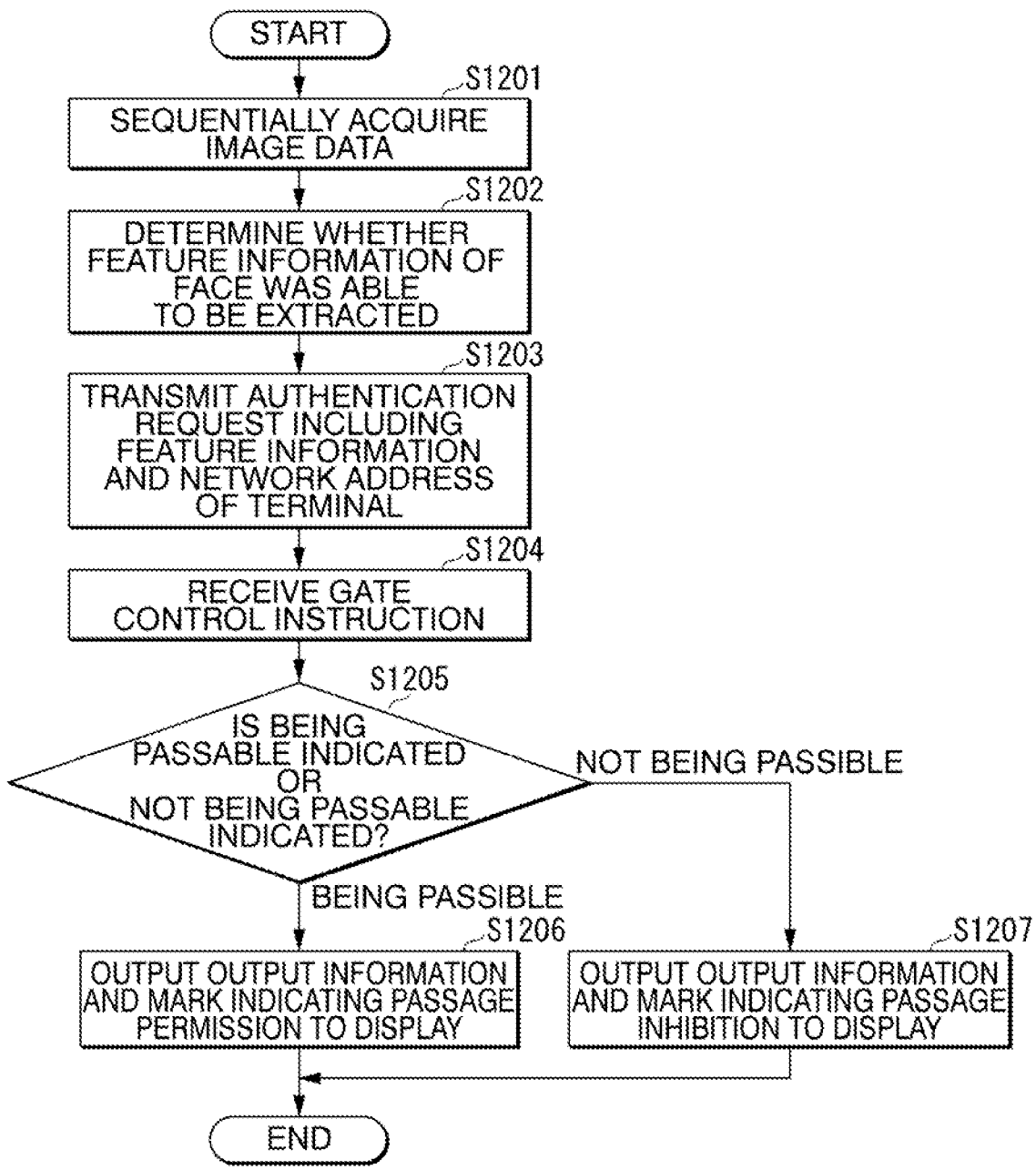
FIG. 22 is a diagram illustrating a processing flow of a management mobile terminal according to the eleventh example embodiment.

FIG. 22 is a diagram illustrating a processing flow of a management mobile terminal according to the eleventh example embodiment.

Figure 23:
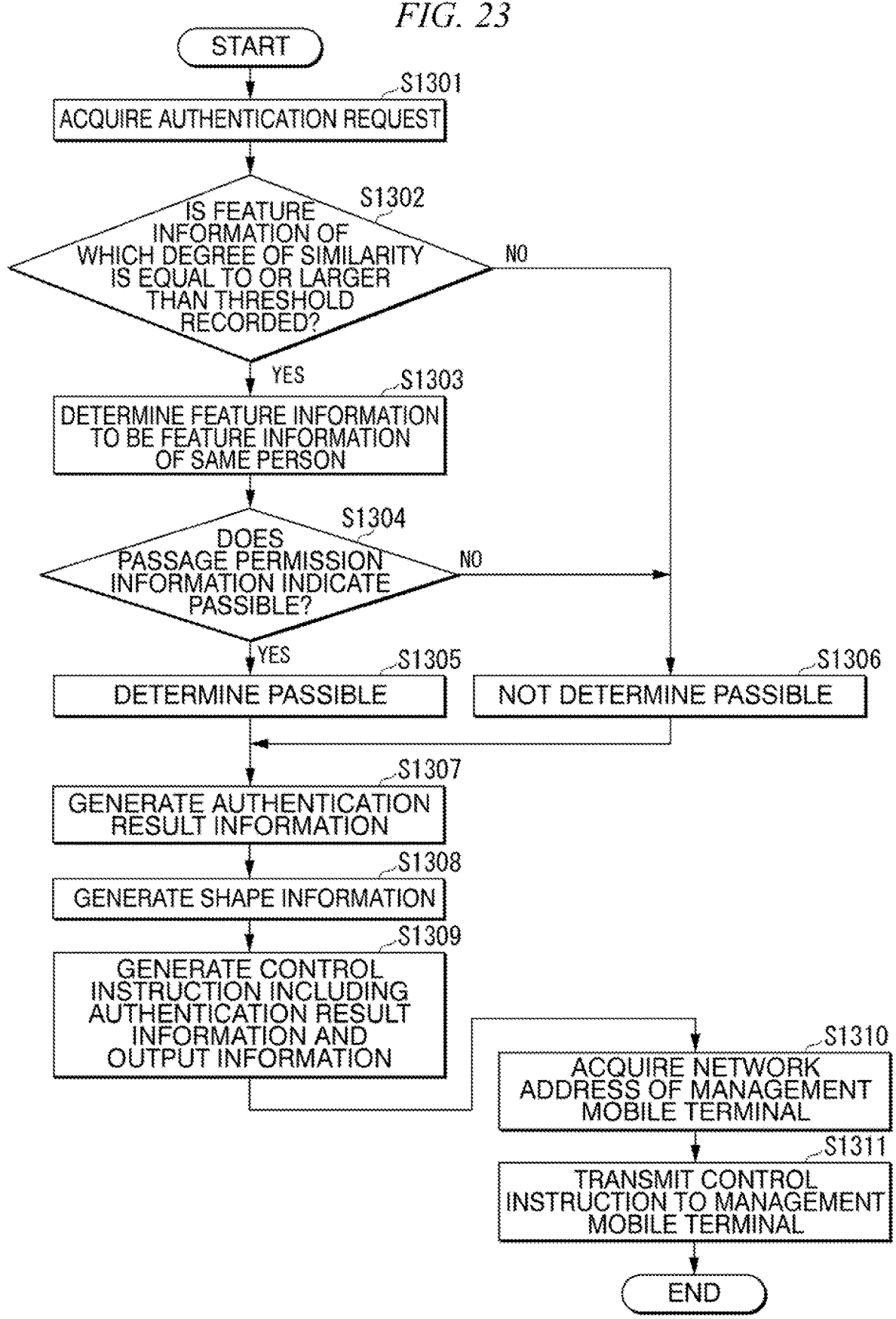
FIG. 23 is a diagram illustrating a processing flow of the information processing device according to the eleventh example embodiment.

FIG. 23 is a diagram illustrating a processing flow of the information processing device according to the eleventh example embodiment.

In the eighth example embodiment described above, a gate control instruction may be configured to be output to the management mobile terminal 44 that is managed by a guard or the like. Hereinafter, an example of such a case will be described.

The guard is assumed to activate a dedicated application recorded in the management mobile terminal 44 near the gate device 10. The management mobile terminal 44 is assumed to be communicatively connected to the information processing device 20 via a communication network.

A guard captures an image of a face of a user approaching the gate device 10 to pass through the gate device 10 using the management mobile terminal 44 carried by the guard. The management mobile terminal 44 sequentially acquires image data including images captured by a camera included in the management mobile terminal (Step S1201). When the image data is acquired, the management mobile terminal 44 starts to extract feature of a face shown in an image represented by the image data.

The management mobile terminal 44 determines whether feature information of a face of a person was able to be extracted from an image included in the image data (Step S1202). In a case in which the feature information of the face was able to be extracted, the management mobile terminal 44 transmits an authentication request including the feature information and the network address of the management mobile terminal to the information processing device 20 (Step S1203).

The acquisition unit 21 of the information processing device 20 acquires an authentication request (Step S1301). The authentication unit 22 calculates the degree of similarity between the feature information of a face included in the authentication request and feature information of each of a plurality of faces recorded in the database 104 and determines whether feature information of which the degree of similarity is equal to or larger than a predetermined threshold is recorded in the database 104 (Step S1302).

In a case in which feature information of a face of which the degree of similarity with the feature information included in the authentication request is equal to or larger than the predetermined threshold is registered in the database 204, the authentication unit 22 determines feature information having the highest degree of similarity as feature information of the same person as the user represented by the feature information included in the authentication request (Step S1303).

The authentication unit 22 determines whether passage permission information associated with feature information of the same person as the user indicates passable (Step S1304). For example, the authentication unit 22 determines whether passage permission information associated with the feature information of the same person as the user indicates passage permission. In a case in which the passage permission information associated with the feature information of the same person as the user indicates passage permission, the authentication unit 22 determines that the user is passable (Step S1305).

On the other hand, in a case in which feature information of which the degree of similarity is equal to or higher than a predetermined threshold is not recorded in the database 204 or in a case in which the passage permission information associated with the feature information of the same person as the user indicates passage inhibition, the authentication unit 22 determines that the user is not passable (Step S1306). The authentication unit 22 generates authentication result information indicating passable or not passable (Step S1307).

In addition, the authentication unit 22 acquires an ID of a user registered in the database 204 in association with the feature information of the same person as the user. When the authentication result information is generated, the authentication unit 22 outputs a process start instruction including the ID of the user to the generation unit 23.

The generation unit 23 acquires an ID of a user based on the process start instruction. It is assumed that the ID of the user is represented in a number string of 10 digits. The generation unit 23 acquires a number string of the last four digits of the 10-digit number string based on the ID of the user. The generation unit 23 generates output information determined in correspondence with the ID of the user using the four-digit number string and an output information generation algorithm (Step S1308). It is assumed that the output information is information that represents a shape.

The output unit 24 acquires the authentication result information generated by the authentication unit 22 and the output information generated by the generation unit 23. The output unit 24 generates a control instruction that includes the authentication result information and the output information (Step S1309). The output unit 24 acquires a network address of the management mobile terminal 44 included in the authentication request (Step S1310). The output unit 24 transmits a control instruction addressed to the acquired network address of the management mobile terminal 44 (Step S1311).

The management mobile terminal 44 carried by the guard receives the control instruction (Step S1204). The management mobile terminal 44 acquires an authentication result from the control instruction. The management mobile terminal 44 determines whether information included in the authentication result information indicates passable or not passable (Step S1205). In a case in which information indicating passible is included in the authentication result information, the management mobile terminal 44 outputs the output information and a mark indicating passage permission to the display 13 (Step S1206).

In accordance with this, the guard can recognize that the authentication result of the user to pass through the gate device 10 is passage permission using the management mobile terminal 44. In addition, the guard causes information displayed on the display 13 to be visually recognized by the user. In accordance with this, the user recognizes that passage is permitted based on the mark indicating passage permission and recognizes that the passage permission is for him or her by recognizing that the passage permission is output information determined in accordance with an ID of the user by visually recognizing the output information. Then, the user passes through the gate device 10. Alternatively, a guard can determine passible/not passible using the management mobile terminal 44 and thus, even at a place at which the gate device 10 cannot be introduced, can perform entrance management of users using the management mobile terminal 44.

On the other hand, in a case in which information indicating passage inhibition is included in the authentication result information, the management mobile terminal 44 outputs the output information and the mark indicating passage inhibition to the display 13 (Step S1207). In accordance with this, the guard can recognize that the authentication result of the user to pass through the gate device 10 is passage inhibition using the management mobile terminal 44. In addition, the guard causes the information displayed on the display 13 to be visually recognized by the user. In accordance with this, the user recognizes that passage is inhibited based on the mark indicating passage inhibition and recognizes that the passage inhibition is for him or her by recognizing that the passage inhibition is output information determined in accordance with an ID of the user by visually recognizing the output information. The user may talk with the guard for passing through the gate device 10 or the like without passing through the gate device 10.

According to the process of the eleventh example embodiment described above, a person managing the gate device 10 of a guard and the like captures an image of a user to pass through the gate device 10 using the management mobile terminal 44 and, as a result, can display the authentication result of the user and the shape information determined in accordance with the identification information of the user on the management mobile terminal 44.

Other Example Embodiment

In each of the example embodiments described above, the information processing system 100 in which the gate device 10 and the information processing device 20 are connected via a communication network has been described. However, the information processing system 100 may be a computer system in which a device other than the gate device 10 and the information processing device 20 are connected via a communication network.

For example, the information processing system 100 may be a guiding device, a ticketing machine, an automatic vending machine, or any other device instead of the gate device 10. Such devices will be referred to as display devices. In such a device, at least a device acquiring biometric information such as a camera (a camera, a fingerprint scanner, a vein scanner, or the like) and a display may be provided. The information processing device 20 may be configured not to perform the authentication process. In such a case, the display device transmits a process request including feature information of a face of a user to the information processing device 20. The information processing device 20 similarly generates shape information based on feature information of the face. The information processing device 20 transmits shape information to the display device. The display device receives the shape information and displays the shape information on the display. In accordance with this, a user can check shape information determined in accordance with identification information of the user.

In each of the example embodiments described above, although the process is performed using the feature information of a face, other biometric information such as iris information may be used instead of the feature information of a face. In other words, the gate control unit 151 acquires iris information of the eye of a user from a captured image. The information processing device performs a similar process using the iris information instead of the feature information of a face in each of the example embodiments described above. The biological information may be any other information such as fingerprint information, vein information of a palm, or the like.

(Minimal Configuration)

Figure 24:
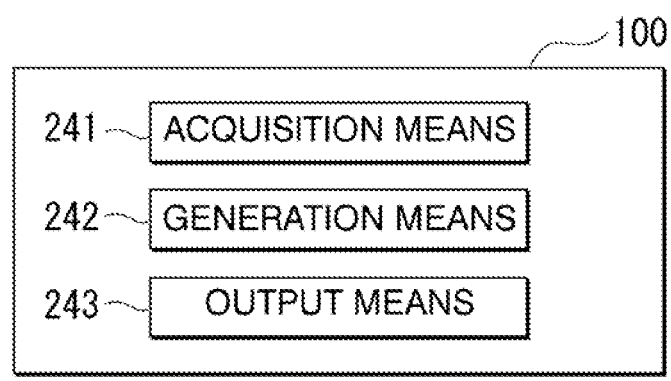
FIG. 24 is a diagram illustrating a minimal configuration of an information processing system according to this disclosure.

FIG. 24 is a diagram illustrating a minimal configuration of an information processing system.

Figure 25:
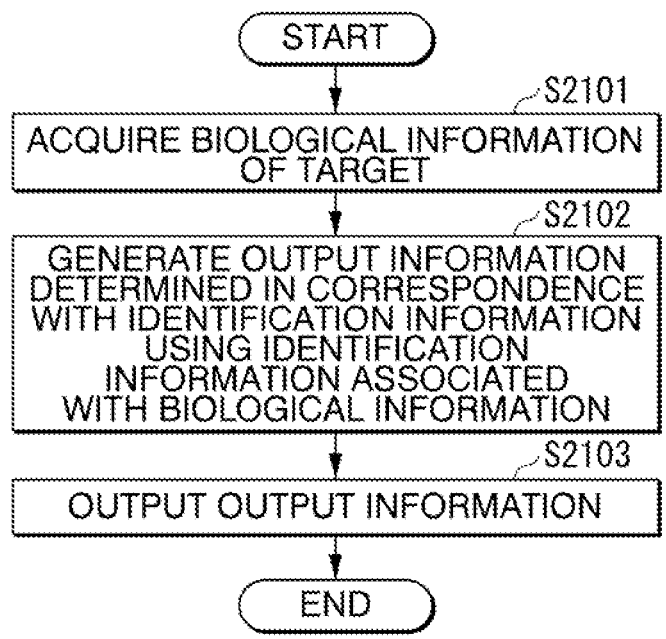
FIG. 25 is a diagram illustrating a processing flow of an information processing system representing a minimal configuration of this disclosure.

FIG. 25 is a diagram illustrating a processing flow of the information processing system representing the minimal configuration.

The information processing system 100 at least includes an acquisition means 241, a generation means 242, and an output means 243.

The acquisition means 241 acquires biological information of a target (Step S2101).

The generation means 242 generates output information determined in correspondence with identification information using the identification information associated with the biological information (Step S2102).

The output means 243 outputs the output information (Step S2103).

As above, although each example embodiment of this disclosure has been described with reference to the drawings, a specific configuration is not limited to such an example embodiment, and a design change, and the like in a range not departing from the concept of this disclosure are included therein.

REFERENCE SIGNS LIST

1 Gate main body
4 Mobile terminal
10 Gate device
11 Camera
13 Display
15 Gate control device
151 Gate control unit
152 Output information control unit
153 Communication control unit
20 Information processing device
21 Acquisition unit (acquisition means)
22 Authentication unit
23 Generation unit (generation means)
24 Output unit (output means)
100 Information processing system

What is claimed is:

1. An information processing system, comprising:
a memory configured to store instructions; and
a processor configured to execute the instructions to:
acquire biological information of a target;
generate output information indicating a combination of a plurality of pieces of determined information, representing shapes or colors, determined in accordance with a plurality of characters included in a character string and positions of the plurality of characters in the character string, using the identification information, including the character string, associated with the biological information; and
output the output information,
wherein the processor is configured to execute the instructions to:
identify, for each of the positions of the plurality of characters in the character string, a piece of determined information associated with a character range in which a character at a position is included, among a plurality of character ranges each including a plurality of different characters, to generate the output information.

2. The information processing system according to claim 1, wherein the processor is configured to execute the instructions to:
generate the output information determined in correspondence with the identification information using the identification information and an output information generation algorithm.

3. The information processing system according to claim 2,
wherein the output information generation algorithm is an algorithm generating the output information by combining the plurality of pieces of determined information determined in accordance with characters included in the character string and positions of the plurality of characters in the character string.

4. The information processing system according to claim 3, wherein the processor is configured to execute the instructions to:
identify positions of the shapes represented by the output information in accordance with the plurality of characters and the positions of the plurality of characters in the character string.

5. The information processing system according to claim 1, wherein the processor is configured to execute the instructions to:
acquire related information relating to the target associated with the identification information and generate the output information further including the related information.

6. The information processing system according claim 1, further comprising a gate device including an output device that is an output destination of the output information,
wherein the processor is configured to execute the instructions to:
acquire the biological information acquired by a biological information reading device included in the gate device; and
output the output information to the output device.

7. The information processing system according to claim 1, wherein the processor is configured to execute the instructions to:
acquire output destination information representing a terminal carried by the target associated with the biological information and output the output information to the terminal carried by the target based on the output destination information.

8. An information processing method comprising:
acquiring biological information of a target;
generating output information indicating a combination of a plurality of pieces of determined information, representing shapes or colors, determined in accordance with a plurality of characters included in a character string and positions of the plurality of characters in the character string, using the identification information, including the character string, associated with the biological information; and
outputting the output information,
wherein the generating includes identifying, for each of the positions of the plurality of characters in the character string, a piece of determined information associated with a character range in which a character at a position is included, among a plurality of character ranges each including a plurality of different characters, to generate the output information.

9. A non-transitory computer-readable recording medium storing a program which causes a computer of an information processing system to execute:
acquiring biological information of a target;
generating output information indicating a combination of a plurality of pieces of determined information, representing shapes or colors, determined in accordance with a plurality of characters included in a character string and positions of the plurality of characters in the character string, using the identification information, including the character string, associated with the biological information; and
outputting the output information,
wherein the generating includes identifying, for each of the positions of the plurality of characters in the character string, a piece of determined information associated with a character range in which a character at a position is included, among a plurality of character ranges each including a plurality of different characters, to generate the output information.

* * * * *